(12) United States Patent
Shankar et al.

(10) Patent No.: US 8,998,248 B2
(45) Date of Patent: Apr. 7, 2015

(54) MOUNTING ARRANGEMENTS FOR AIRBAGS

(71) Applicant: Autoliv ASP, Inc., Ogden, UT (US)

(72) Inventors: Balaskandan Shankar, Ogden, UT (US); Mark Hadfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/842,605

(22) Filed: Mar. 15, 2013

(65) Prior Publication Data

US 2014/0265263 A1  Sep. 18, 2014

(51) Int. Cl.
  *B60R 21/20* (2011.01)
  *B60N 2/427* (2006.01)
  *B60R 21/207* (2006.01)
  *B60R 21/217* (2011.01)

(52) U.S. Cl.
  CPC ............ *B60N 2/42763* (2013.01); *B60R 21/20* (2013.01); *B60R 21/207* (2013.01); *B60R 21/2171* (2013.01)

(58) Field of Classification Search
  CPC ............................... B60R 21/20; B60R 21/207
  USPC ...................................................... 280/728.2
  See application file for complete search history.

(56) References Cited

U.S. PATENT DOCUMENTS

| | | | |
|---|---|---|---|
| 6,231,068 B1 * | 5/2001 | White et al. | 280/728.2 |
| 6,802,526 B2 * | 10/2004 | Dumbrique et al. | 280/728.2 |
| 7,226,077 B2 * | 6/2007 | Abe | 280/736 |
| 7,938,436 B2 * | 5/2011 | Lunt et al. | 280/728.2 |
| 7,997,611 B2 | 8/2011 | Dufaut et al. | |
| 8,360,464 B2 * | 1/2013 | Enders | 280/730.1 |
| 8,408,582 B2 * | 4/2013 | Lunt et al. | 280/728.2 |
| 8,500,155 B2 * | 8/2013 | Enders | 280/728.2 |
| 8,622,422 B1 * | 1/2014 | Thomas et al. | 280/730.2 |
| 8,651,513 B2 * | 2/2014 | Okamoto et al. | 280/728.2 |
| 2005/0230939 A1 * | 10/2005 | Abe et al. | 280/728.2 |
| 2006/0108777 A1 * | 5/2006 | Mabuchi et al. | 280/730.2 |
| 2006/0279073 A1 * | 12/2006 | Hotta et al. | 280/730.1 |
| 2007/0205587 A1 * | 9/2007 | Yoshikawa et al. | 280/730.1 |
| 2008/0088118 A1 * | 4/2008 | Wipasuramonton et al. | 280/728.2 |
| 2008/0238048 A1 * | 10/2008 | Ishida | 280/728.2 |
| 2010/0109365 A1 * | 5/2010 | Shibata et al. | 296/37.12 |
| 2011/0148077 A1 * | 6/2011 | Enders | 280/728.2 |
| 2011/0316263 A1 * | 12/2011 | Lunt et al. | 280/730.2 |
| 2012/0025496 A1 * | 2/2012 | Schneider et al. | 280/728.2 |
| 2013/0229002 A1 * | 9/2013 | Enders | 280/728.2 |

\* cited by examiner

*Primary Examiner* — Nicole Verley
(74) *Attorney, Agent, or Firm* — Stoel Rives LLP

(57) ABSTRACT

An airbag cushion assembly can include a mounting assembly and an airbag cushion. The mounting assembly includes a plate which may be coupled to the airbag cushion, and which may also include a fastener which is used to attach the assembly to a vehicle.

28 Claims, 24 Drawing Sheets

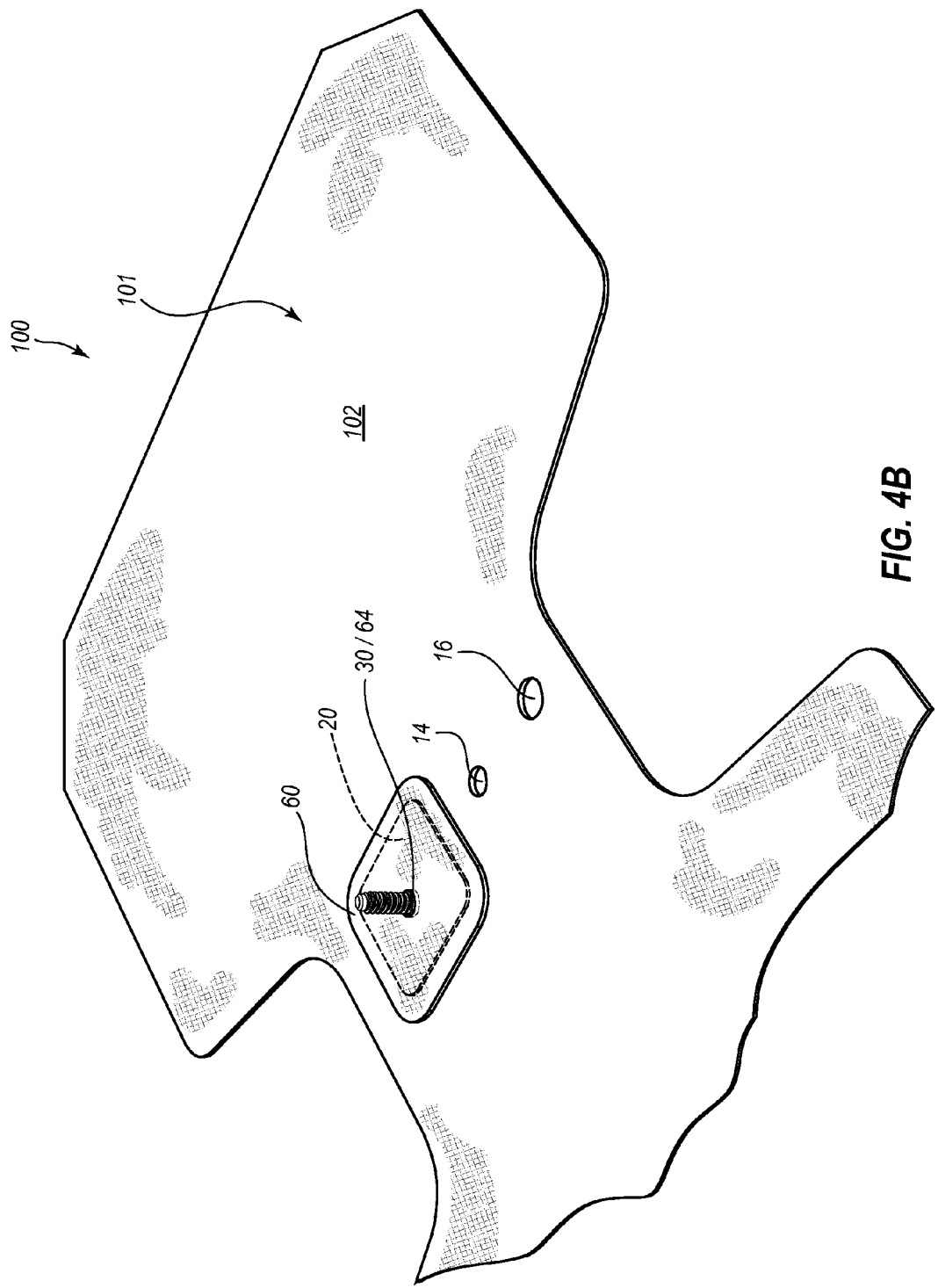

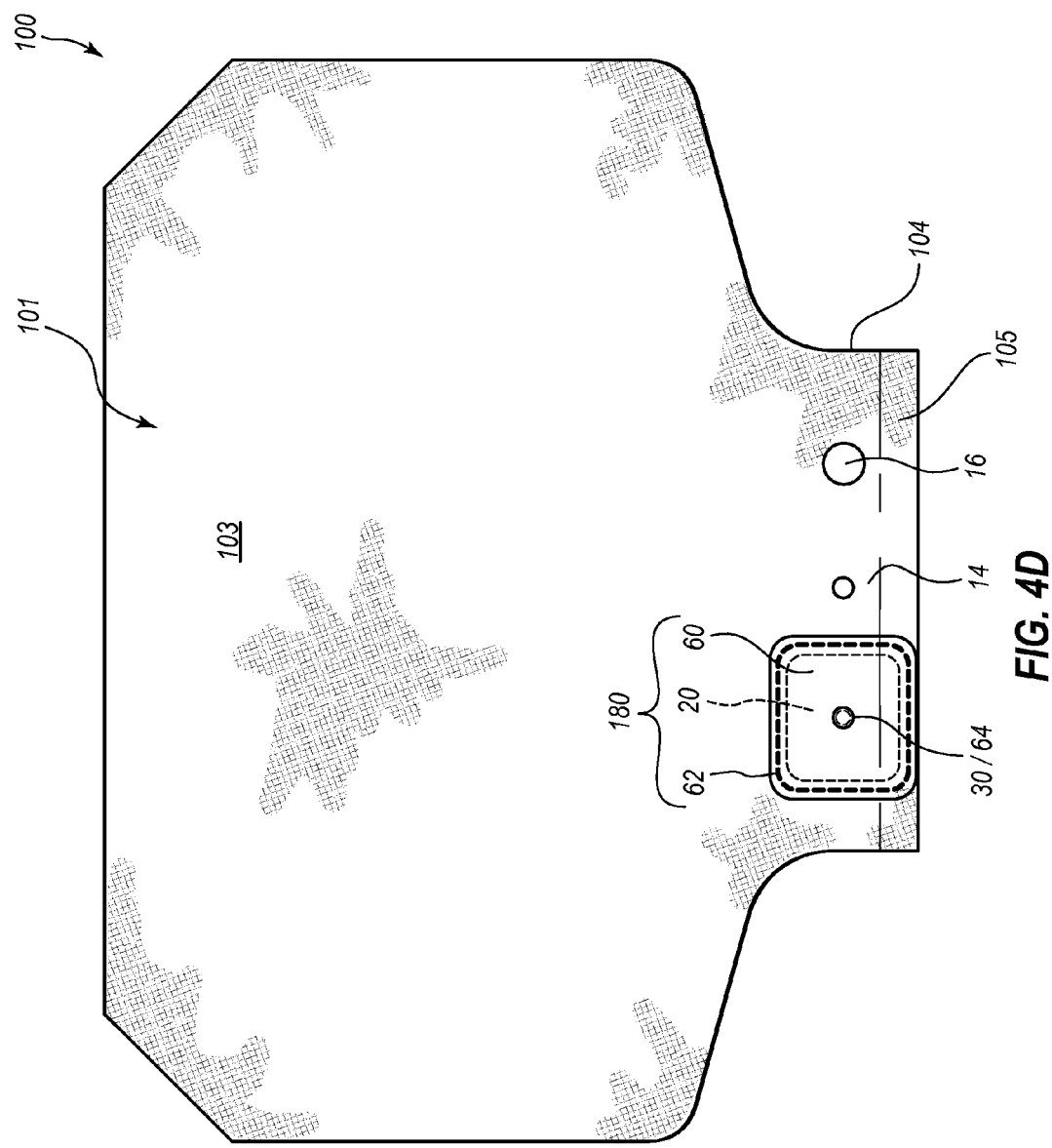

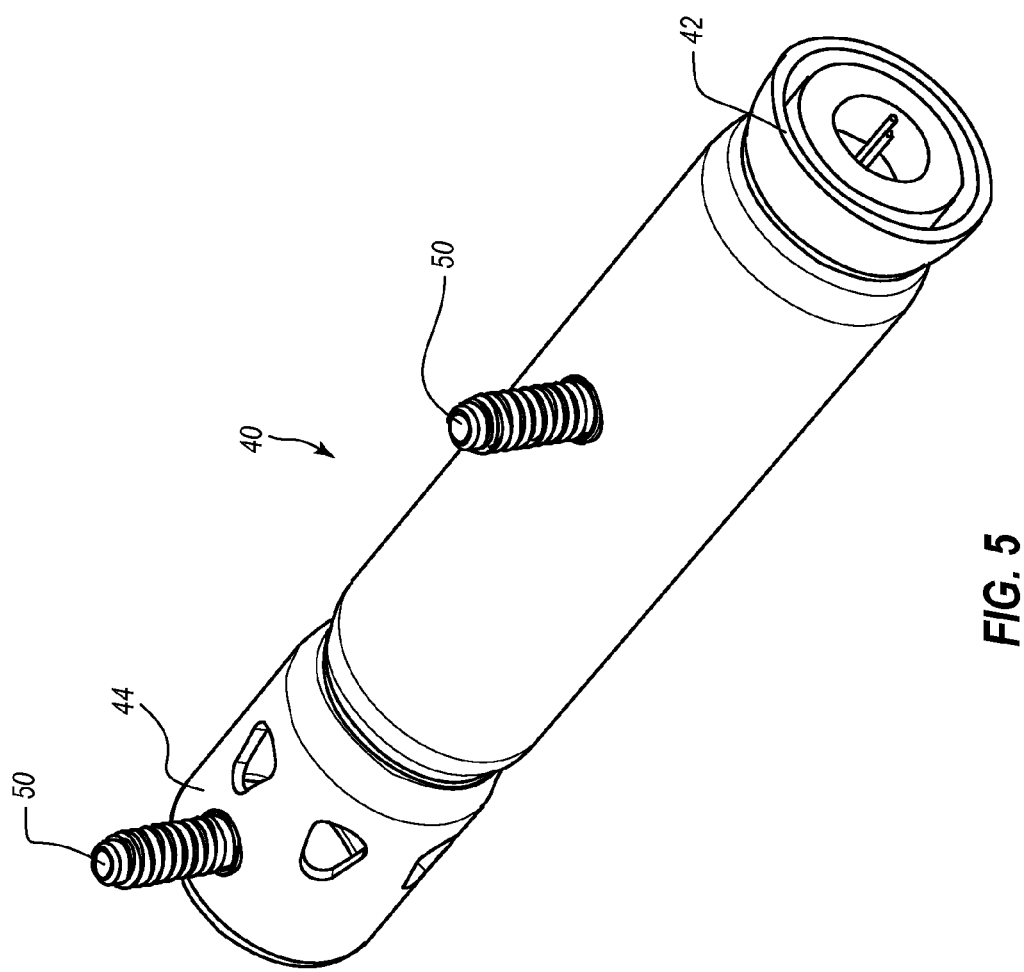

MOUNTING ARRANGEMENTS FOR AIRBAGS

TECHNICAL FIELD

The present disclosure relates generally to the field of automotive protective systems. More specifically, the present disclosure relates to mounting arrangements for inflatable airbag cushions.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 4B is another perspective view of the portion of the embodiment of an airbag assembly of FIG. 4A showing an airbag cushion with a mounting assembly approximated to the cushion prior to attachment of the mounting assembly to the airbag cushion;

FIG. 4D is a plan view of the portion of the embodiment of an airbag assembly of FIG. 4A in a later stage of manufacture, wherein a first portion of the airbag cushion has been folded over a second portion of the airbag cushion with the mounting assembly disposed at an exterior of the airbag cushion;

FIG. 5 is a perspective view of an embodiment of an inflator that is compatible with the airbag assembly of FIG. 1A, wherein the inflator has two mounting stems;

DETAILED DESCRIPTION

Figure 1A:
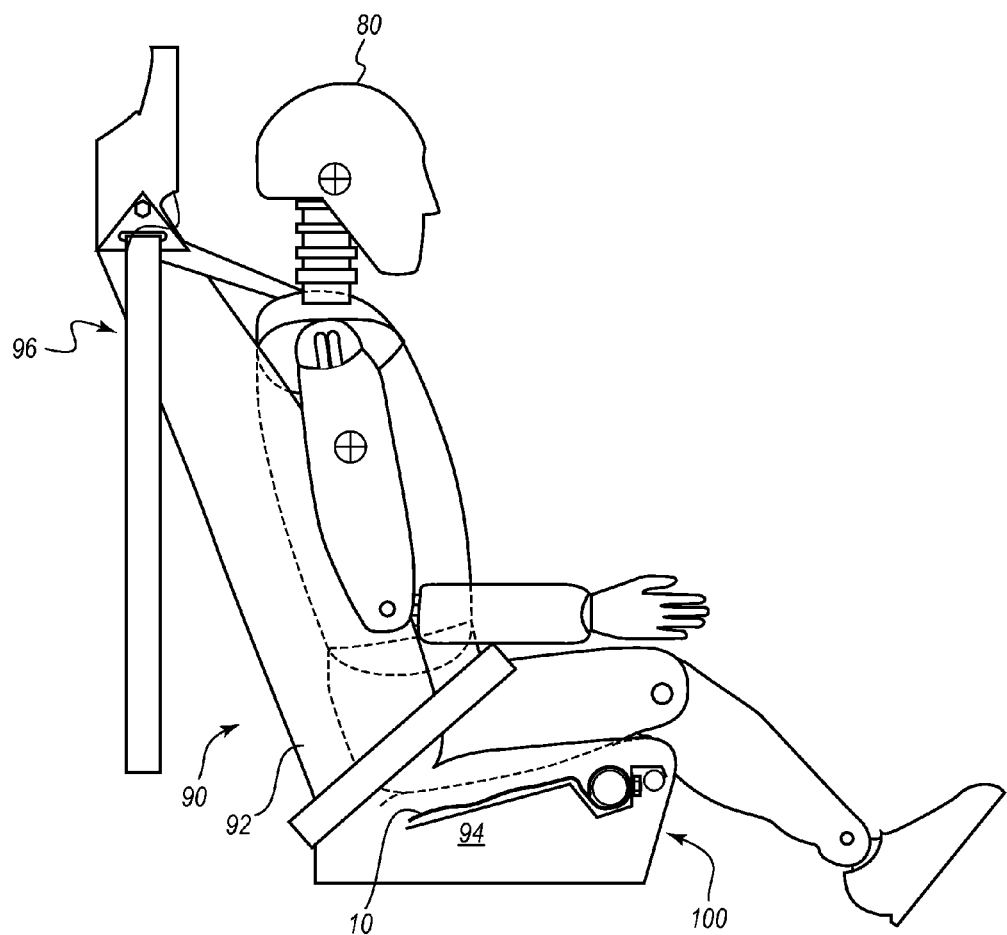
FIG. 1A is a side elevation view of an embodiment of an airbag assembly used in a vehicle with a vehicle occupant.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other and/or coupled to each other by a fastener of any suitable variety (e.g., mounting hardware, adhesive, stitching), regardless of whether the fastener extends through additional components. The phrase "fluid communication" is used in its ordinary sense, and is broad enough to refer to arrangements in which a fluid (e.g., a gas and/or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors, under the seats, adjacent to the roof rail of the vehicle, in an overhead position, or at the knee or leg position. In the following disclosure, "airbag" generally refers to an inflatable pelvic restraint cushion, although the principles discussed may apply to other airbag types in other embodiments.

Pelvic restraint cushions are typically installed underneath the seat cushions of a vehicle. The airbags are generally laid flat parallel to the plane of the seat cushion and secured to the seat frame. During a collision event, an inflator is triggered, which rapidly fills the airbag with inflation gas. Thus, the airbag rapidly changes from a flat configuration to an expanded or deployed configuration. For example, the expanding airbag can push the seat cushion in an upward fashion so as to tilt the legs of a vehicle occupant up and toward the passenger, to reduce the occupants' forward momentum which may occur as a result of the collision. The inflator may be triggered by any suitable device or system, and the triggering may be in response to and/or influenced by one or more vehicle sensors.

Certain embodiments of airbag assemblies that are disclosed herein are suited for pelvic restraint cushion airbags, although other airbag configurations are contemplated. In some embodiments, the airbags can include a plate that is coupled to the airbag cushion, and the plate may be a portion of a mounting assembly. The plate may be rigid, and an elongated fastener, such as a threaded bolt, may be attached to the plate. In certain embodiments, the plate and the elongated fastener are sewn to the airbag cushion (e.g., at an exterior thereof).

Embodiments of airbag assemblies disclosed herein may be mounted, or secured, to a vehicular structure via the elongated fastener attached to the plate. The plate may be fixed in relation to the airbag cushion (e.g., the plate can be mounted to the airbag cushion in a non-rotatable and/or non-translatable fashion). In some embodiments, an inflator is part of the airbag assembly, and may contain mounting stems which are also secured to the vehicular structure. Various advantages of the airbag assemblies will be apparent from the disclosure that follows.

FIG. 1A depicts a vehicle seat 90 containing an airbag assembly 100. The seat 90 which supports an occupant 80 via the seat back 92 and seat cushion 94 portions of the seat 90. The airbag cushion 10, which is shown in an uninflated state, lies substantially flat underneath the seat cushion 94, with the occupant 80 sitting in the vehicle seat 90 secured also by a shoulder and lap seatbelt 96.

Figure 1B:
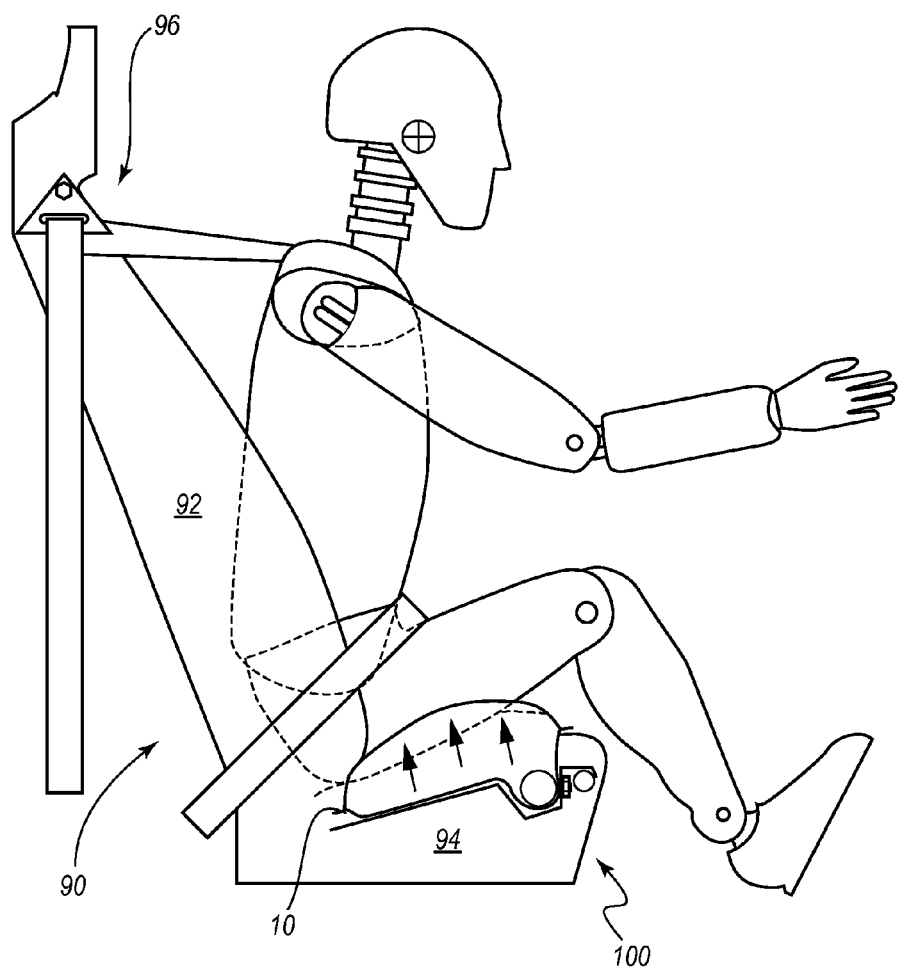
FIG. 1B is a side elevation view of the airbag assembly of FIG. 1A after an airbag cushion thereof has been deployed.

FIG. 1B depicts the vehicle seat 90, where the airbag cushion 10 in seat cushion 94 has been deployed in response to a collision. The occupant 80 is restrained from moving forward by seatbelt 96, and the legs of occupant 80 are pushed upward and slightly toward the occupant by the inflated airbag cushion 10, to reduce any forward momentum of the occupant. That is, the airbag cushion 10 of FIGS. 1A and 1B functions as a pelvic restraint cushion. Much of the following discussion focuses on the airbag assembly 100 of FIGS. 1A and 1B, which is thus provided in the context of pelvic restraint airbag cushions. However, as further discussed hereafter, certain features discussed with respect to the airbag assembly 100 may be used in other contexts, such as knee airbags, side curtain airbags, etc.

Figure 2:
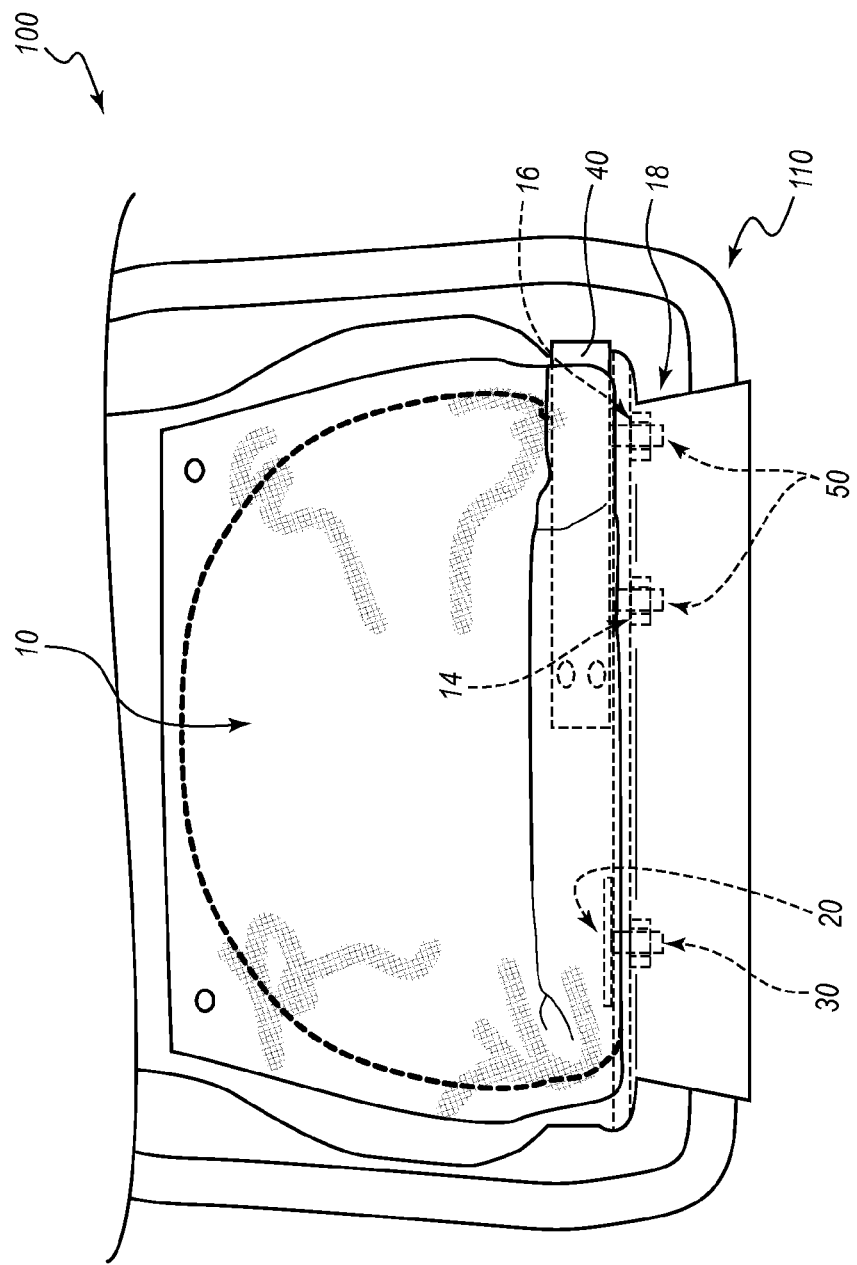
FIG. 2 is an plan view of the airbag assembly of FIG. 1A, wherein a seat cushion is not shown to provide a view of the airbag cushion with an inflator and a mounting assembly.

The airbag assembly 100 is shown underneath seat cushion 94 in FIG. 2. The assembly includes an airbag cushion 10, a mounting plate 20, an elongated fastener 30 attached to the mounting plate 20, and in certain embodiments, may also include an inflator 40 with mounting stems 50. The airbag assembly 100 may be attached to a vehicular structure at least by the elongated fastener 30. In certain embodiments that include an inflator 40 such as that shown in FIG. 2, the mounting stems 50 may further aid in securing the airbag assembly 100 to the vehicular structure.

The vehicular structure may be any suitable structure to which the airbag cushion can be mounted or secured within a vehicle. Suitable structures include a portion of the frame or body of the vehicle, such as a seat frame 110 or roof. For example, the airbag assembly may be secured to a portion of the vehicle seat 90. A suitable structure may be an intermediate structure that is connected to such vehicle frame or body. For example, the term "vehicular structure" may also be used to refer to a housing which may contain, for example, a knee airbag, as the housing is a structure that is or can be mounted to a vehicle.

Figure 3:
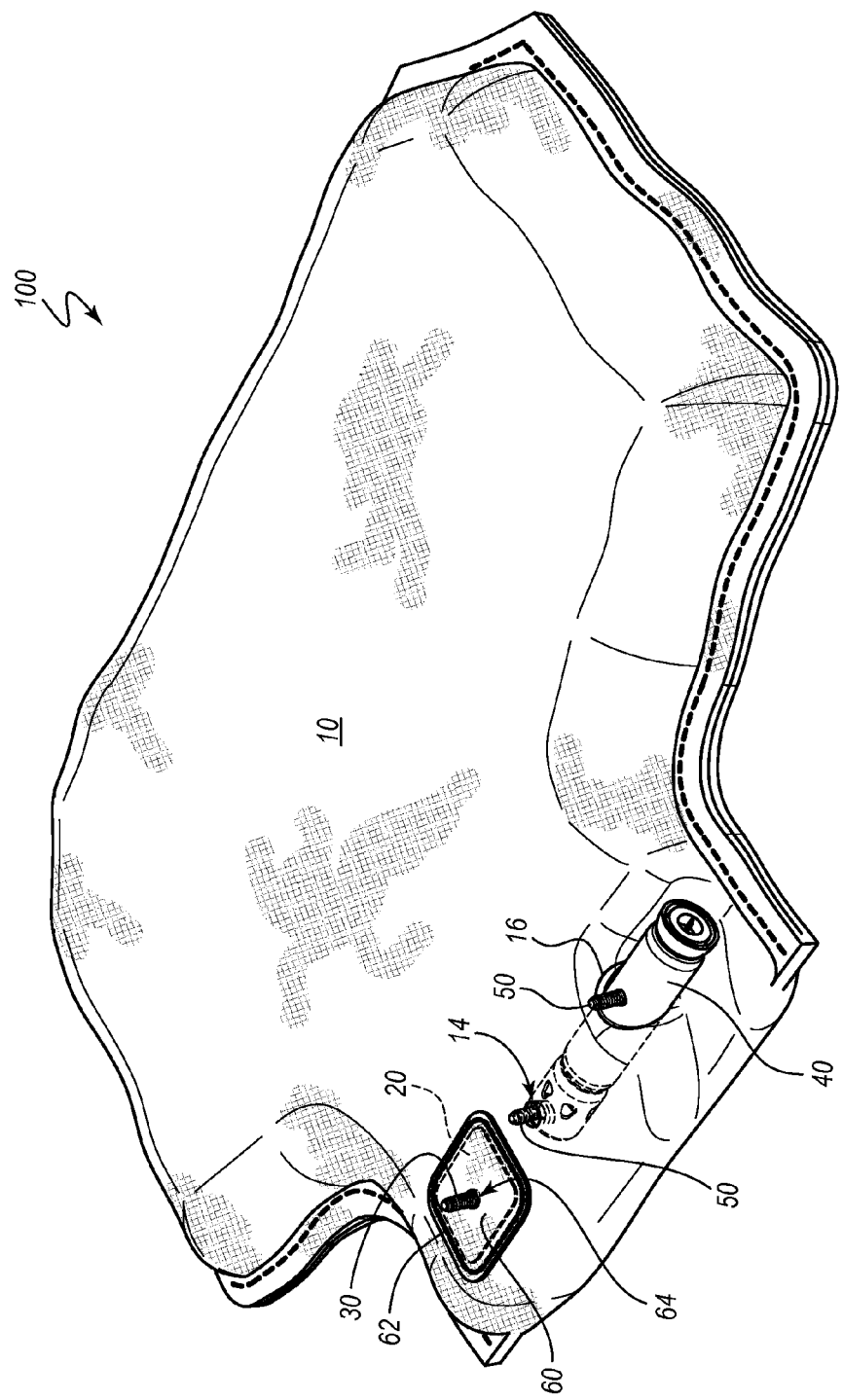
FIG. 3 is a perspective view of a portion of the airbag assembly of FIG. 1A showing another view of the airbag cushion with the inflator and the mounting assembly.

In FIG. 3, as considered together with FIG. 2, the airbag assembly 100 is shown with the airbag cushion 10 partially inflated. In the illustrated embodiment, plate 20 is coupled to airbag cushion 10 via a cover 60, which has an opening 64 for elongated fastener 30 to extend through the cover at an exterior of the cushion.

The airbag cushion 10 has an interior surface in which the inflating gas is contained, and an exterior surface. The airbag cushion 10 thus defines an inflatable interior cavity enclosed by the interior surface and, in certain embodiments, comprises at least one opening through which an elongated fastener or a mounting stem may be inserted to extend through the membrane of the airbag cushion to an exterior of the airbag cushion 10. In an embodiment, the airbag cushion 10 includes an opening 12 through which the elongated fastener 30 may protrude, and further includes two openings 14, 16, through which mounting stems 50 of the inflator 40 may protrude. In some embodiments, as presented in more detail below and seen in FIG. 3, the opening 12 through which the elongated fastener 30 may protrude does not reside directly in the inflatable membrane between the interior gas-containing surface and the exterior of the airbag cushion 10, but instead resides as an opening 64 in a cover attached to the membrane.

One of the openings 14, 16 of airbag cushion 10 may be sized to insert the inflator 40 into the interior of the cushion, with mounting stems 50 able to protrude to an exterior of the cushion through the openings. In the illustrated embodiment, the openings 12, 14, 16 are present in airbag cushion 10 to allow for the elongated fastener 30 and the inflator mounting stems 50 to extend outwardly from the airbag cushion 10. In certain embodiments, the airbag cushion 10 comprises a first opening 16 sized to receive at least a portion of the inflator 40 into the interior of the cushion and a second opening 14 through which the mounting stem of the inflator can extend from the cavity to an exterior of the airbag cushion.

The measurements of and between openings 12, 14, 16 are variable and dictated by the type, size, and load required by the elongated fastener 30 and inflator mounting stems 50, and the type and location of airbag 10, as well as to conform with existing industry systems. For example, in certain embodiments, the distance between the center of the opening 12 for elongated bolt 30 and the center of first opening 14 for a mounting stem 50 is between about 60 and about 150 mm; between about 80 and about 120 mm; between about 100 and about 110 mm; no more than about 200 mm; about 108 mm; or no less than about 20 mm. In some embodiments, the distance between the center of the opening 12 for elongated bolt 30 and the center of second opening 16 for a second mounting stem 50 is between about 150 and about 225 mm; between about 170 and about 210 mm; between about 175 and about 200 mm; no more than about 300 mm; about 180 mm; or no less than about 60 mm.

The airbag cushion 10 may be formed of any suitable material. For example, in some embodiments, the airbag cushion 10 is formed of a woven nylon fabric. Moreover, a variety of types and configurations of airbag cushions can be utilized in various embodiments. For example, the size, shape, and proportions of the cushions may vary according to its use in different vehicles or different locations within a vehicle.

The openings 12, 14, 16 may be designed such that they will not undesirably release the inflator gases when the airbag 10 is deployed. The openings 12, 14, 16 may be reinforced such as to prevent tearing, fraying, splitting, or other undesirable weakening of the airbag cushion 10, such as during an inflation event. In some arrangements, a single continuous seam may be provided about the openings 12, 14, 16 in a substantially oval or circular shape, to generally match the shape of the elongated fastener. In certain arrangements, a double continuous seam may be provided.

Plate 20 may be rigid and formed from, for example, metal or plastic. In some embodiments, the plate 20 may be flexible. In certain embodiments, the plate 20 is coupled to the airbag cushion without the elongated fastener extending into, or protruding from, the interior cavity of the airbag cushion.

Figure 4A:
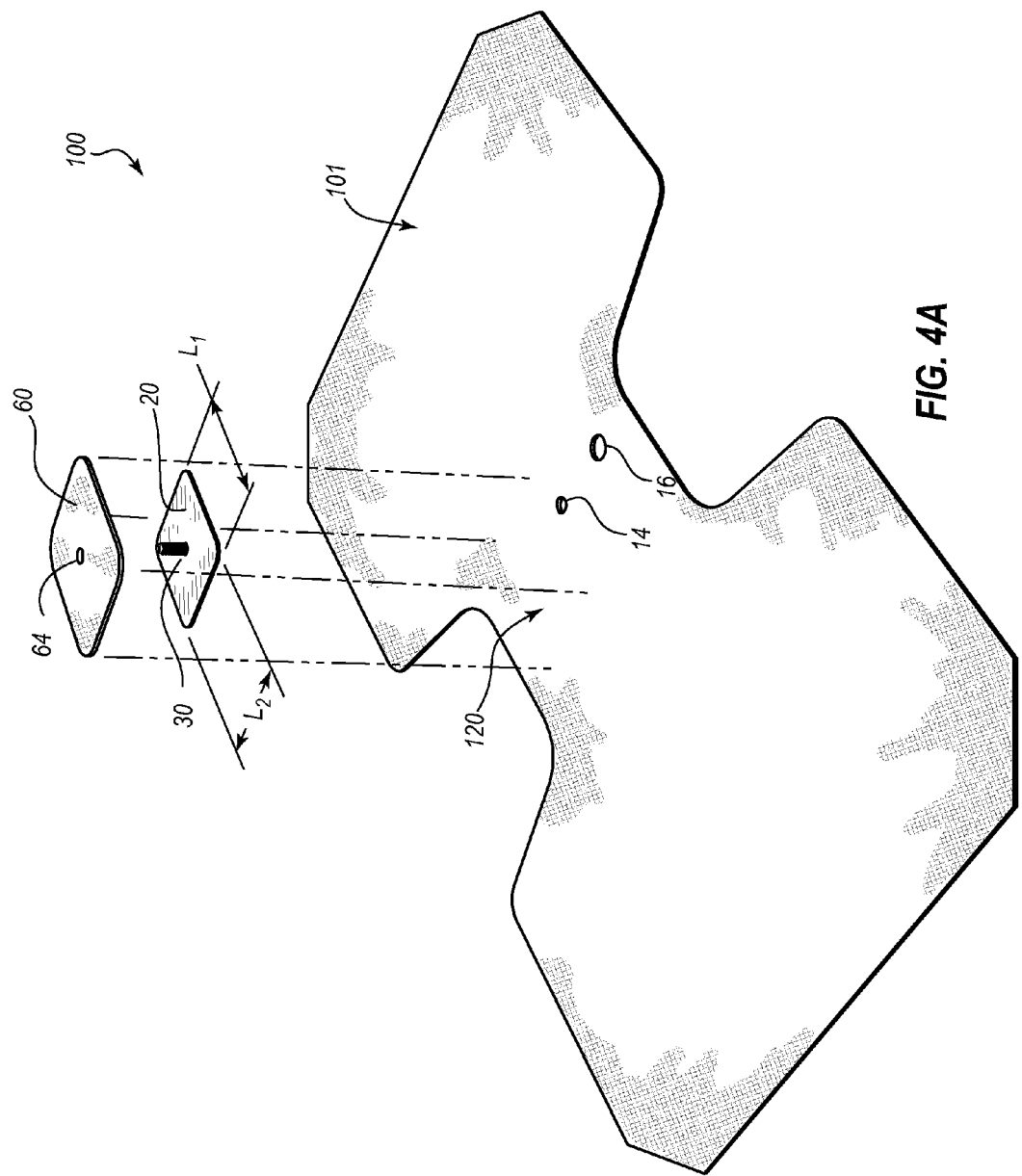
FIG. 4A is a perspective view of a portion of an embodiment of an airbag assembly showing an airbag cushion with a mounting assembly prior to coupling of the mounting assembly to the cushion.

FIG. 4A-F show an embodiment of a mounting assembly being coupled to the airbag cushion 10. As shown in FIG. 4A, the airbag cushion initially comprises an inflatable membrane 101, which may be shaped like an H or I when initially produced in an unfolded state. The plate 20, with the elongated fastener 30 fixed securedly thereto, is placed on an exterior surface of the airbag cushion 10. In some embodiments, the exterior surface of the airbag cushion 10 comprises an attachment region 120.

The plate 20 may have a rectangular shape, wherein L1 and L2 are not equal. Alternatively, L1 may equal L2. The plate 20 may be planar, or it may be other than planar. For example, the plate 20 may have an arcuate cross-sectional profile along one of more cross-sectional directions. Such a profile may be beneficial for enhancing the coupling of the plate 20 to the airbag cushion 10 when the cushion is deployed.

In some embodiments, the plate 20 is coupled to the airbag cushion 10 such that the plate is restricted to an attachment region 120 on the airbag cushion. In certain embodiments, the area of the attachment region 120 of the airbag cushion 10 is greater than an area of a surface of the plate that faces the attachment region. For example, as can be seen in the drawings, the cover 60 may extend about a periphery of the plate 20 when the plate is secured to the airbag cushion 10. In such embodiment, the attachment region of the airbag cushion 10 may correspond in size to the portion of the cover 60 that is stitched to the airbag cushion 10. Thus, an area of the attachment region of the airbag cushion 10 may be larger than an area of the plate 20. In certain of such embodiments, the plate may be permitted to move (e.g., translate) within the pocket. However, even where such slight shifting of the plate 20 may be permitted, the plate 20 may nevertheless be restrained from rotational movement when within the pocket. In some embodiments, an area of the attachment region 120 is the same as an area of the plate 20. For example, in some embodiments, the plate 20 may be directly secured to the airbag cushion 10, as discussed further below. In such embodiments, the attachment region 120 of the airbag cushion may correspond in size with the size of the plate 20.

The plate 20 may comprise a surface that faces outwardly away from the airbag cushion 10. The outwardly facing surface may be instrumental in retaining the airbag cushion 10 in a secure position. As further discussed below, the outwardly facing surface may cooperate with a vehicle structure to frictionally engage the cover 60 between the plate 20 and the vehicle structure. As the cover is attached to the airbag cushion 10, this frictional securing of the cover 60 can in turn secure the airbag cushion 10 in place. The plate 20 may be coupled to the airbag cushion 10 so as to be non-rotatable about a longitudinal axis defined by the elongated fastener 30. The plate may be coupled to the airbag cushion at an exterior of the airbag cushion and, in some embodiments, the coupling restricts the plate to the attachment region 120 of the airbag cushion 10.

The elongated fastener 30 is fixedly secured to the plate 20 and in certain embodiments, is transverse to the plate. For example, in the illustrated embodiment, the plate 20 is substantially planar and is orthogonal to a longitudinal axis of the elongated fastener 30. The plate 20 may extend radially outward from the fastener 30. In some embodiments, the elongated fastener extends from the plate in a direction that is away from the exterior surface of the airbag cushion. The elongated fastener 30 and the plate 20 may be referred to as a mounting assembly 180, which is permanently secured to the airbag cushion 10 by an attachment element. The attachment element extends through the airbag cushion to limit the movement of the plate relative to the airbag cushion. In an embodiment, the attachment element is a stitched seam 62. More generally, the mounting assembly 180 can comprise the elongated fastener 30, the plate 20, and any suitable attachment mechanisms that secure these elements to the airbag cushion 10. Accordingly, in the illustrated embodiment, the "mounting assembly" includes not only the fastener 30 and the plate 20, but also the cover 60 and the stitching 62.

The elongated fastener 30 has a proximal end and a distal end, with the proximal end fixedly attached to the plate. In some embodiments, the distal end is at an exterior of the airbag cushion. In certain embodiments, a proximal end of the elongated fastener may be attached to the plate via welding, glue, or the elongated fastener 30 may be made from the same material, and integral with, the plate 20. In certain embodiments, the plate and the elongated fastener comprise a unitary piece of material. The elongated fastener 30 may be bolt-like and, in an embodiment, is a threaded bolt. In some embodiments, the elongated fastener 30 may be a "Christmas tree" clip or bolt.

As shown in FIG. 4B, the plate 20 may be attached to the airbag cushion 10 using a cover 60, with the plate "sandwiched" between the airbag cushion and the cover. A cover opening 64 is present in cover 60 to allow for elongated fastener 30 to extend outwardly from the airbag cushion 10, and in certain embodiments, represents opening 12. In some arrangements, a single continuous seam may be provided about the opening 64 in a substantially oval or circular shape, to generally match the shape of the elongated fastener. The opening 64 may be reinforced such as to prevent tearing, fraying, splitting, or other undesirable weakening of the cover 60, such as during an inflation event.

Figure 4C:
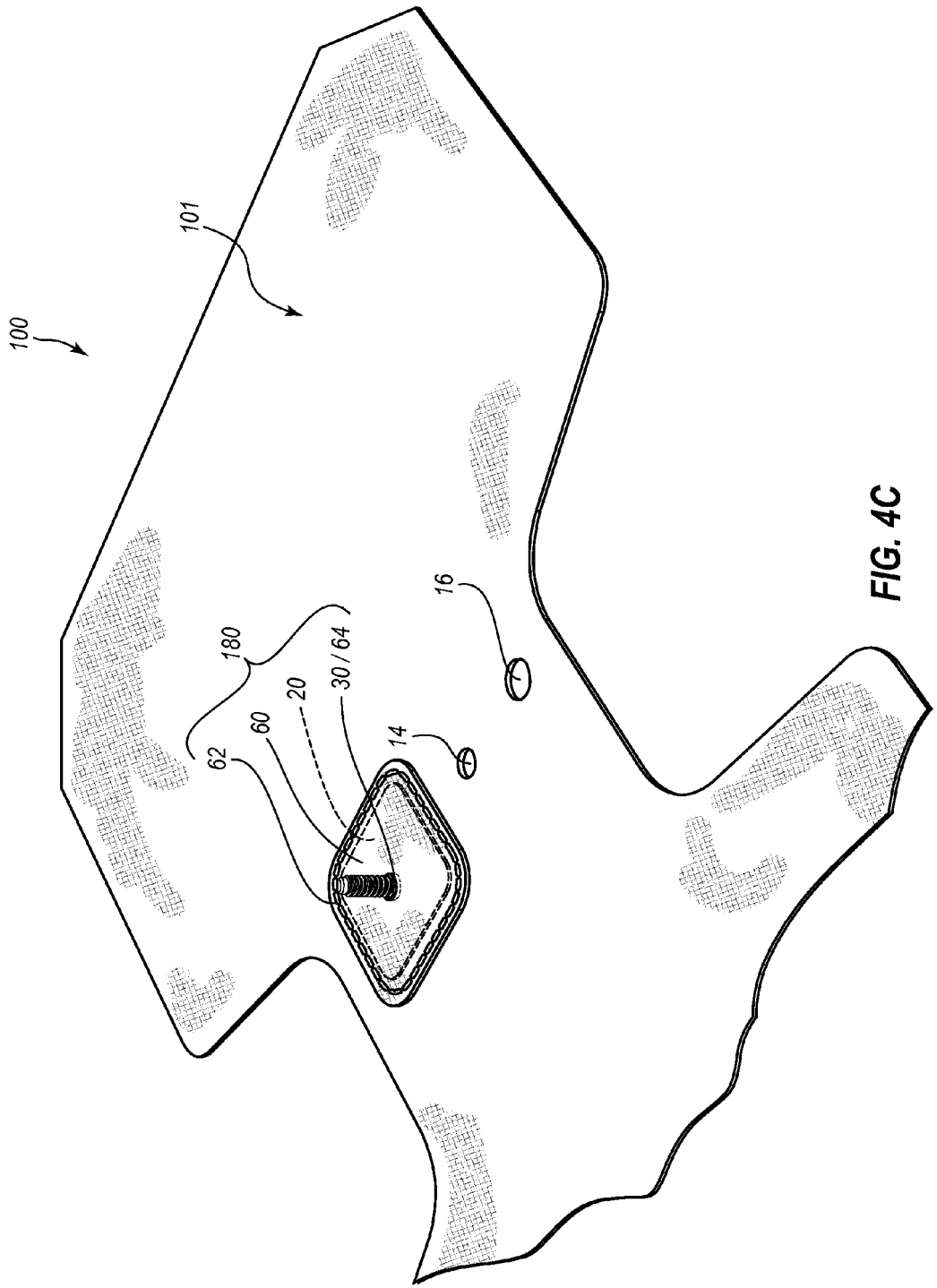
FIG. 4C is a perspective view of the portion of the embodiment of an airbag assembly of FIG. 4A in a later stage of manufacture than those illustrated in FIGS. 4A and 4B that shows an airbag cushion with a mounting assembly coupled to the cushion via stitching.

As shown in FIG. 4C, the cover 60 may be connected to the airbag cushion 10 by various means, including a seam 62 which extends around the perimeter of the cover 60. The seam 62 may be of any suitable variety, and may be formed via stitching, one or more adhesives, taping, welding (e.g., radio frequency welding), heat sealing, or any other suitable technique or combination of techniques. The seam 62 may thus comprise one or more of stitches, welds (e.g., radiofrequency welds), and/or adhesives. In some embodiments, seam 62 may comprise a single row of stitches. In other embodiments, seam 62 may include multiple rows of stitches. In the illustrated embodiment, seam 62 comprises a row of stitches.

The cover 60 may be configured as a pocket at an exterior of the airbag cushion 10, where the plate 20 is at an interior of the pocket. In some embodiments, the cover cooperates with the airbag cushion to define a pocket at an exterior of the airbag cushion, and the plate is at an interior of the pocket. In some embodiments, the plate 10 may able to move within the pocket and is not additionally affixed to the airbag cushion 10.

Figure 11A:
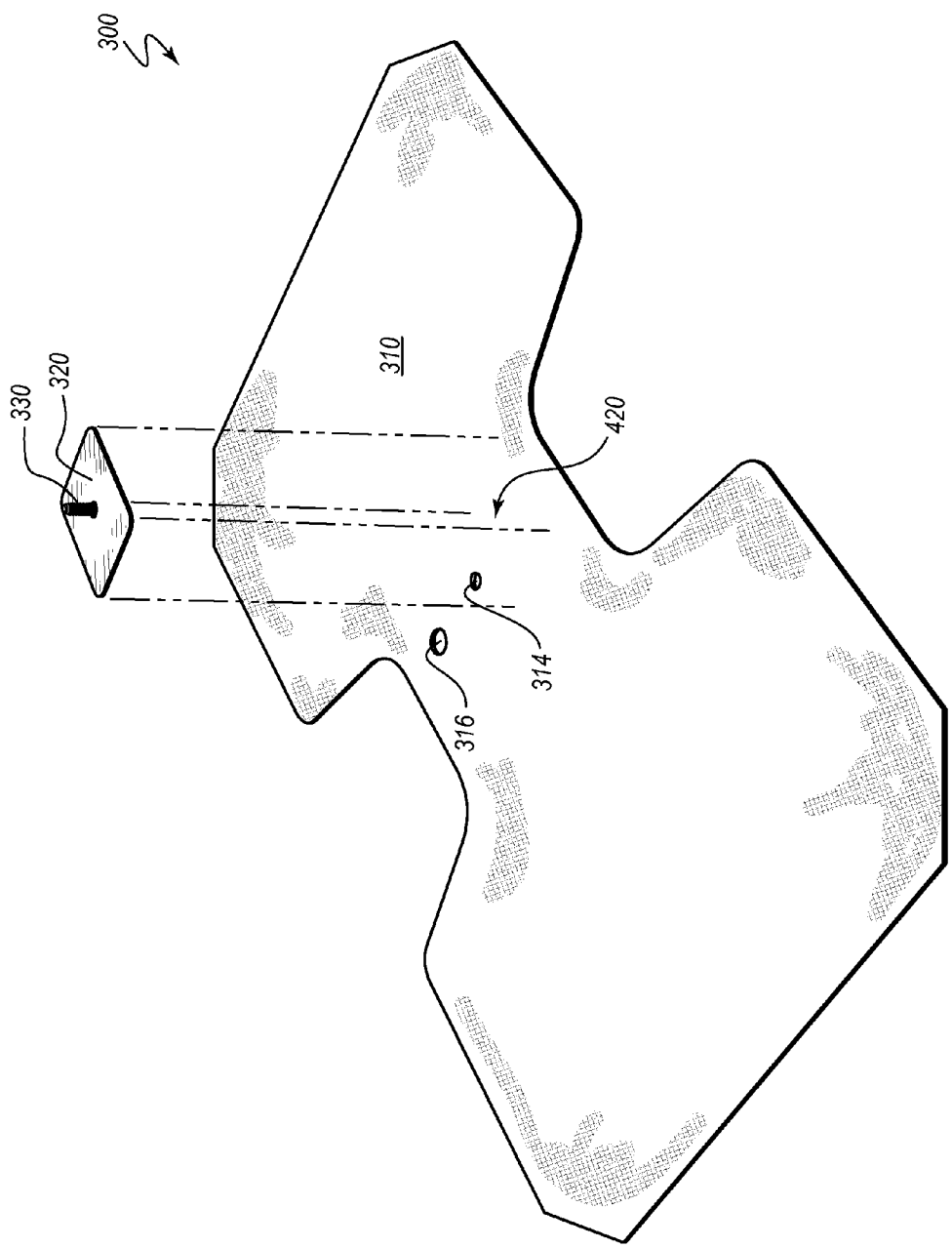
FIG. 11A is a perspective view of a portion of another embodiment of an airbag assembly showing an airbag cushion with a mounting assembly, prior to coupling of the mounting assembly to the airbag cushion.
Figure 11B:
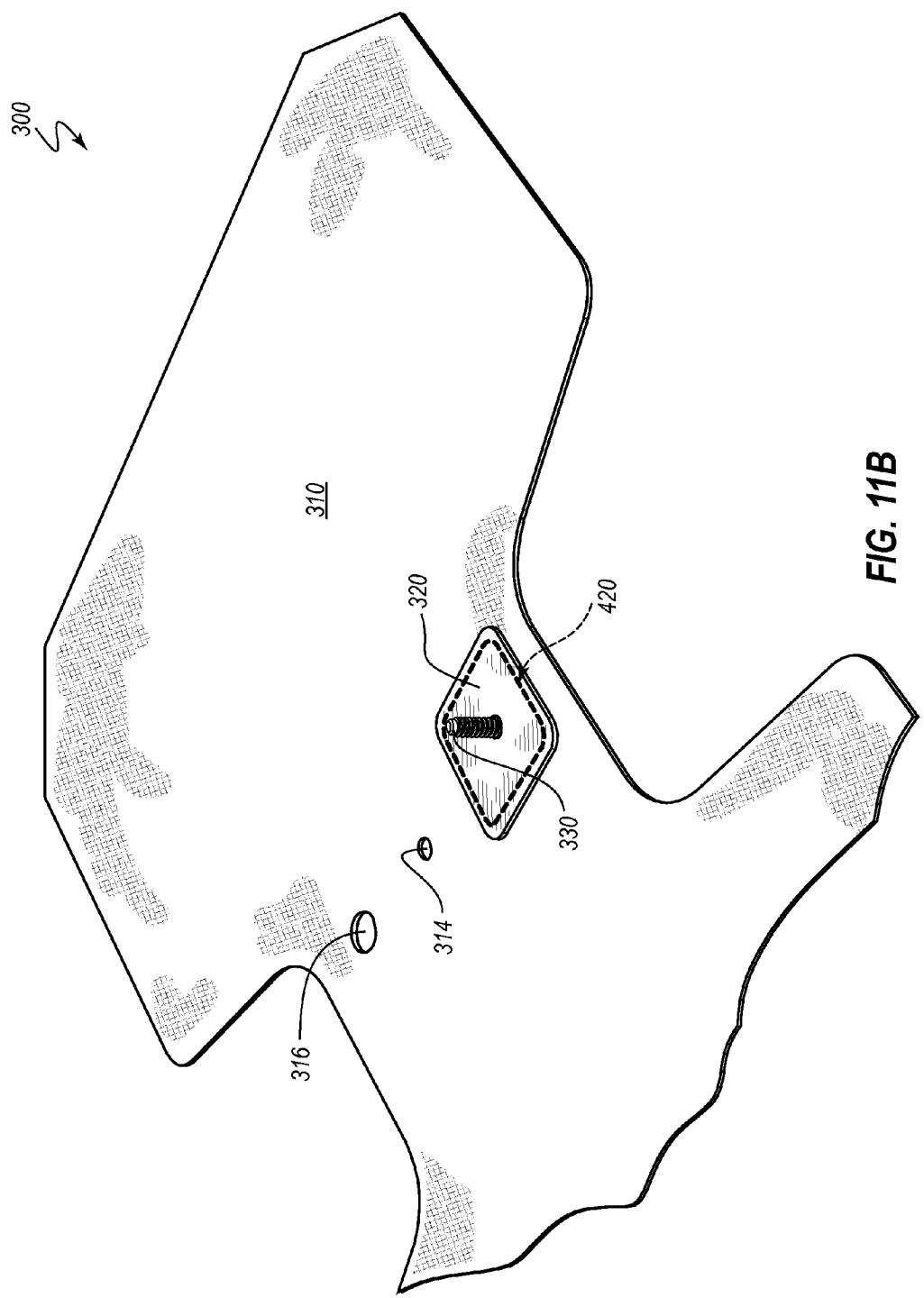
FIG. 11B is a perspective view of the portion of the embodiment of an airbag assembly of FIG. 11A showing the airbag cushion with the mounting assembly coupled to the cushion.

In certain embodiments, the seam 62 may extend through the plate 20 to directly attach the plate to the airbag cushion 10 (see FIG. 11B). In some embodiments, the cover is attached to the airbag cushion via stitching and the stitching fully encompasses a periphery of the plate.

FIG. 4D shows a top view of an embodiment of the airbag assembly, with the airbag membrane 101 folded along the axis 105 such that an upper layer 103 and a lower layer 104 of the membrane are aligned to form the airbag cushion 10.

Figure 4E:
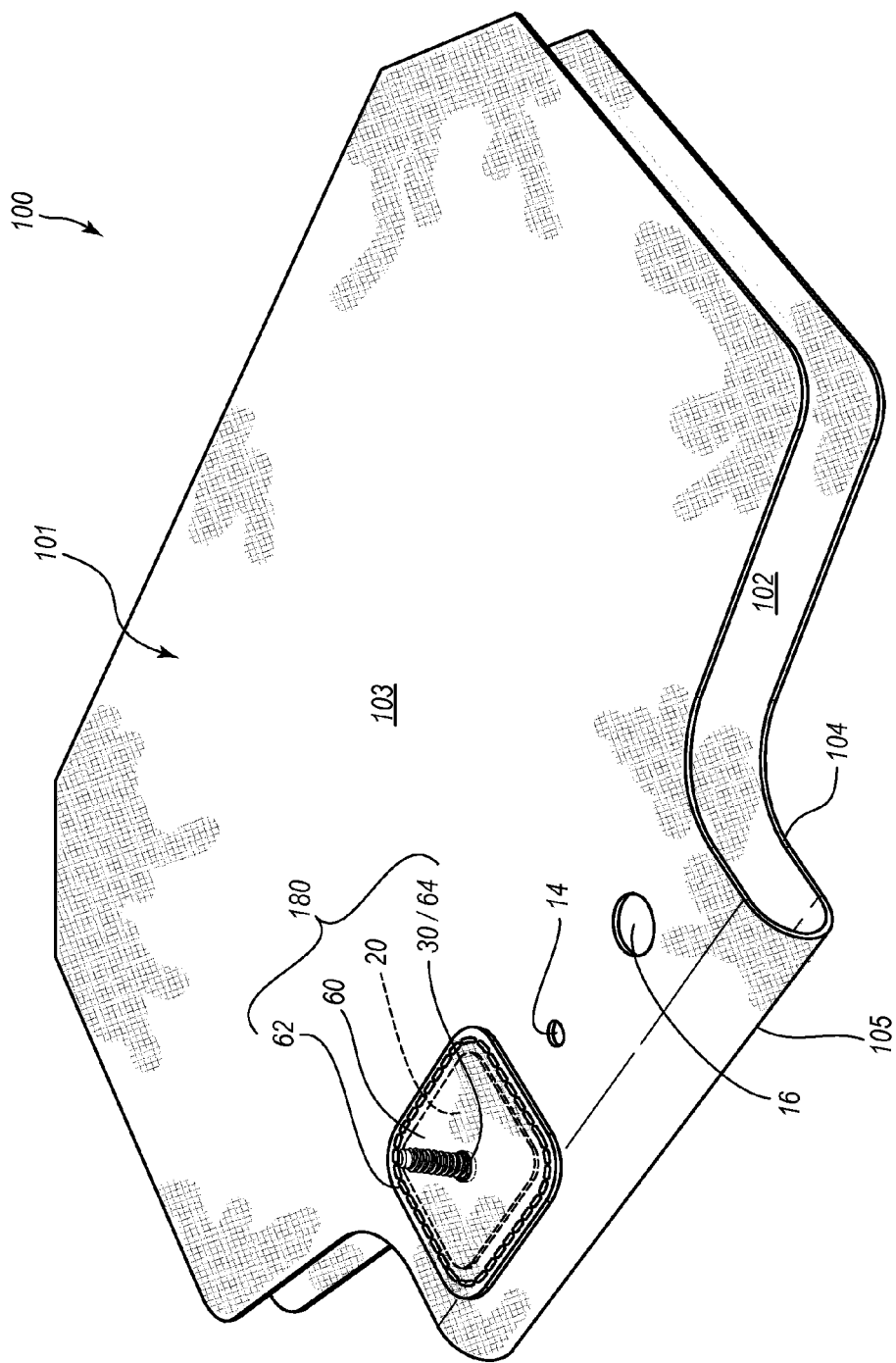
FIG. 4E is a perspective view of the portion of the embodiment of an airbag assembly of FIG. 4A shown at the same stage of manufacture as is depicted in FIG. 4D, wherein a clearer view of an elongated fastener that projects outwardly away from the airbag cushion is provided.
Figure 4F:
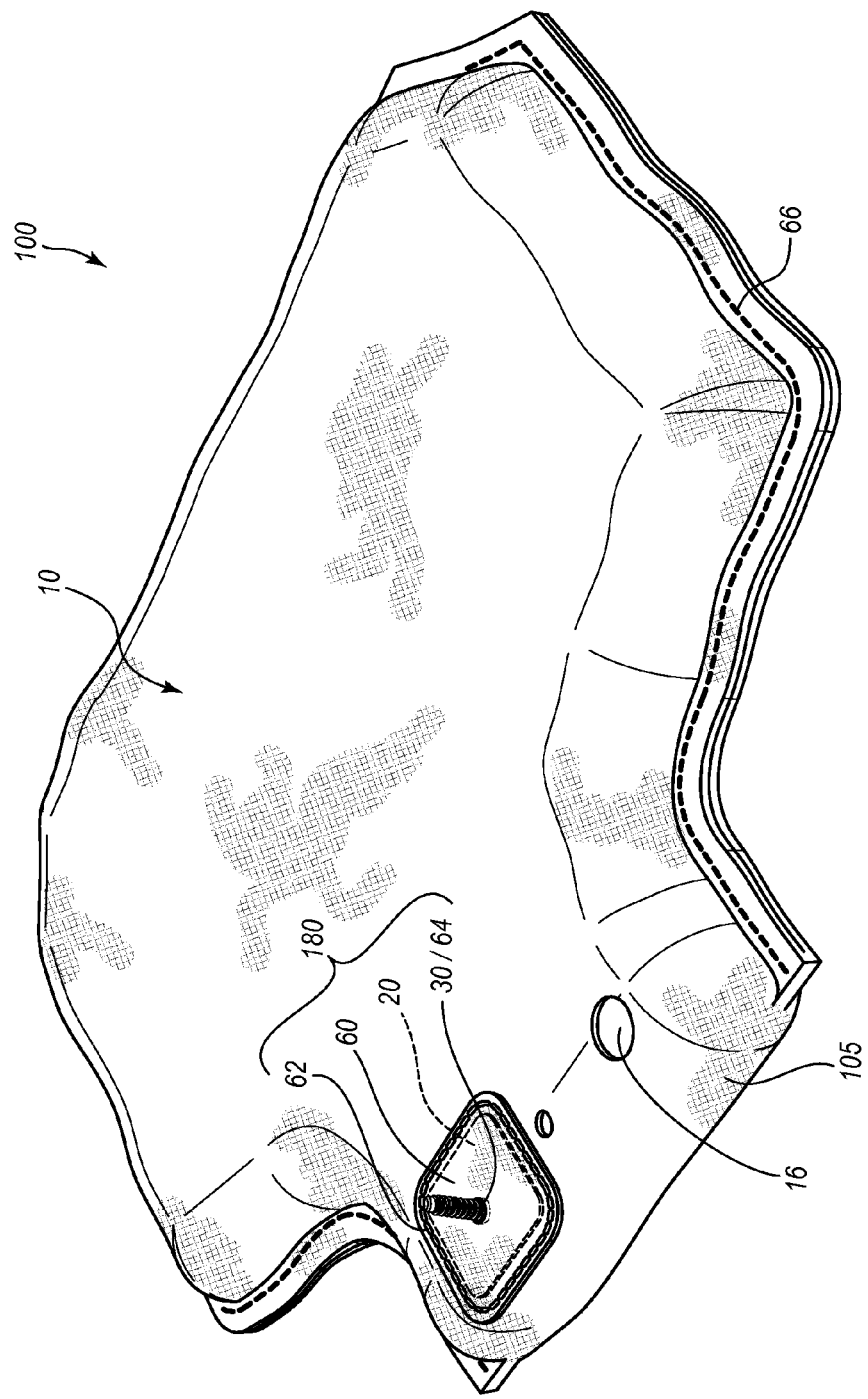
FIG. 4F is another perspective view of the portion of the embodiment of an airbag assembly of FIG. 4A showing the airbag cushion with a mounting assembly coupled to the cushion via stitching after the airbag cushion has been stitched closed.

FIG. 4E shows a side view of the embodiment of the airbag assembly of FIG. 4D, prior to formation of the airbag cushion 10. FIG. 4F shows the airbag cushion in a partially inflated state, with the upper layer 103 and lower layer 104 connected along the perimeter of the airbag cushion with a seam 66. In the illustrated embodiment, the layers are sewn together. Any suitable method may be employed to form the airbag cushion 10. In some instances the seam 66 can be formed via stitching.

FIG. 5 shows an embodiment of an airbag inflator 40. In some embodiments, an inflator 40 is present in the airbag assembly 100, and it may comprise at least one mounting stem 50. The mounting stem 50 is a piece of hardware configured to attach the inflator 40 to a vehicular structure. The mounting stem 50 may be bolt-like and, in an embodiment, is a threaded bolt. The inflator 40 may be elongated in a longitudinal direction with ends 42, 44. The mounting stem 50 may extend in a direction perpendicular to the longitudinal direction.

Figure 6A:
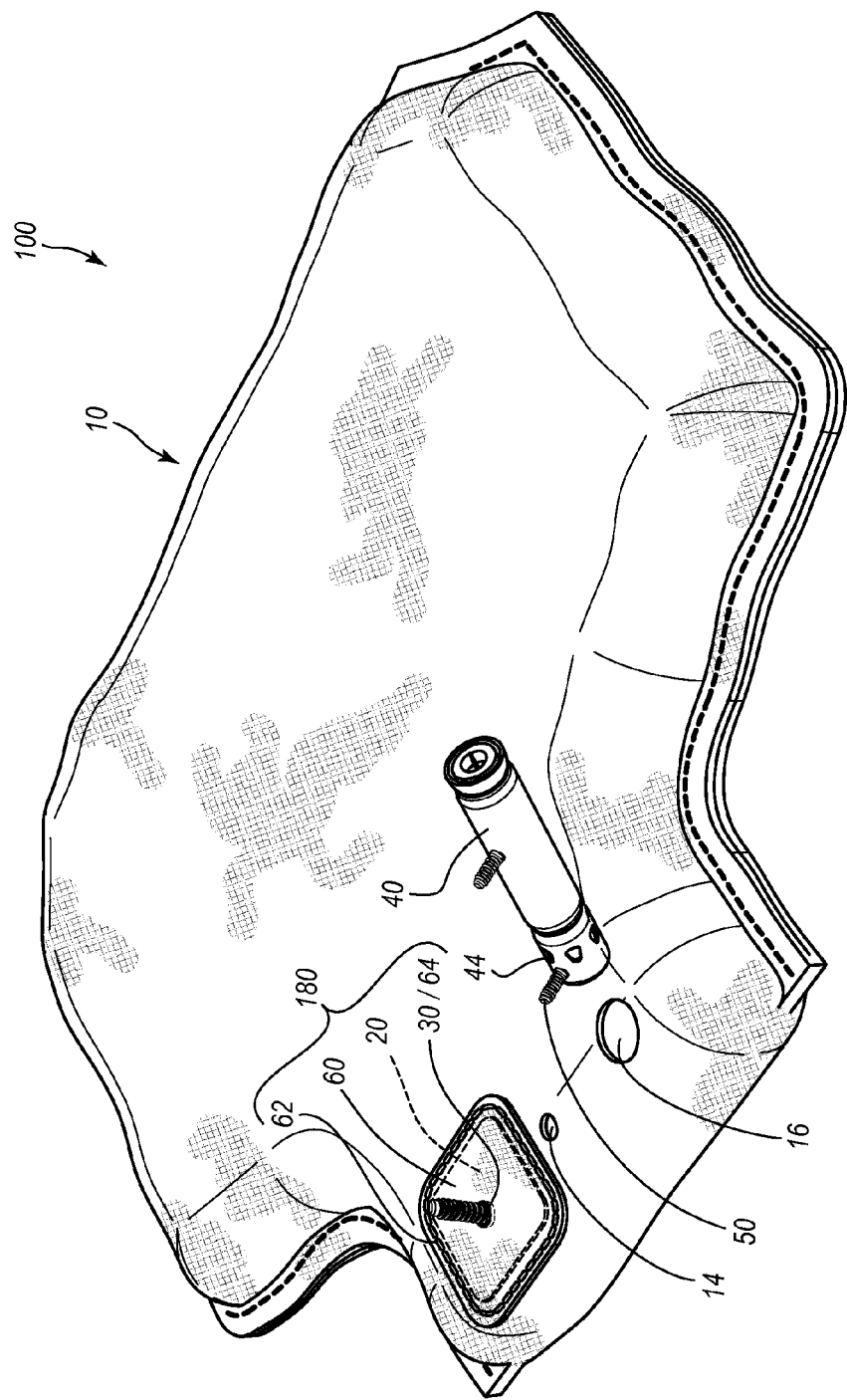
FIG. 6A is a perspective view of the portion of the airbag assembly of FIG. 4F showing the inflator of FIG. 5 prior to being introduced into the airbag cushion.
Figure 6B:
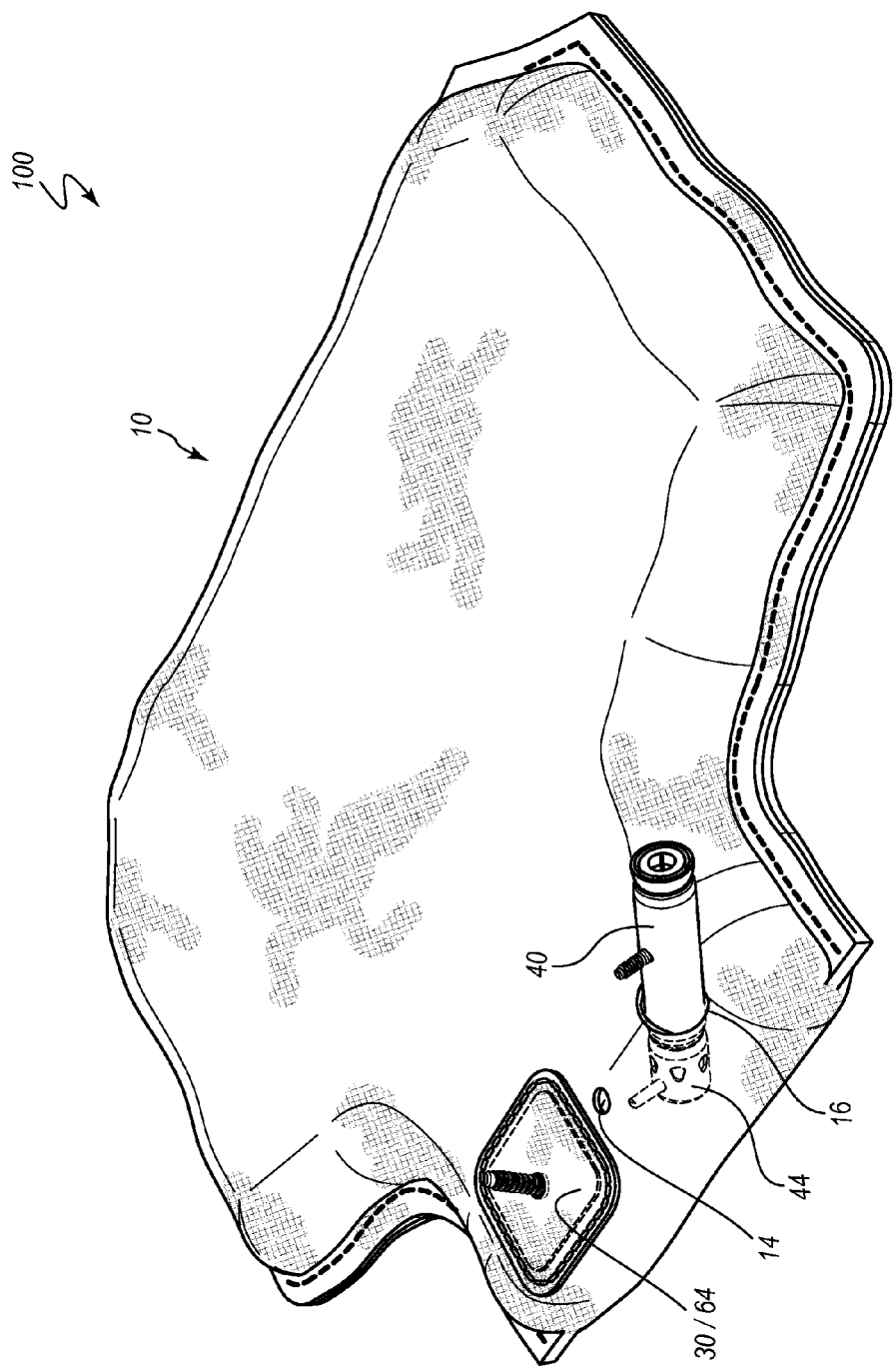
FIG. 6B is another perspective view of the portion of an embodiment of an airbag assembly of FIG. 6A showing the inflator being introduced into the airbag cushion.

FIG. 6A-6B show an embodiment of an airbag assembly comprising an airbag inflator, where the inflator is inserted into the interior of the airbag cushion 10 through opening 16, which is sized to accept the inflator 40. The inflator 40 may further comprise an additional mounting stem 50 that is configured to extend through the first opening 16 of the airbag cushion when the other mounting stem of the inflator 50 extends through the second opening 14 of the airbag cushion. In certain embodiments, the mounting stems are spaced from each other by an amount sufficient to prevent bunching or binding of the airbag cushion 10 between the first and second openings 14, 16.

Figure 7A:
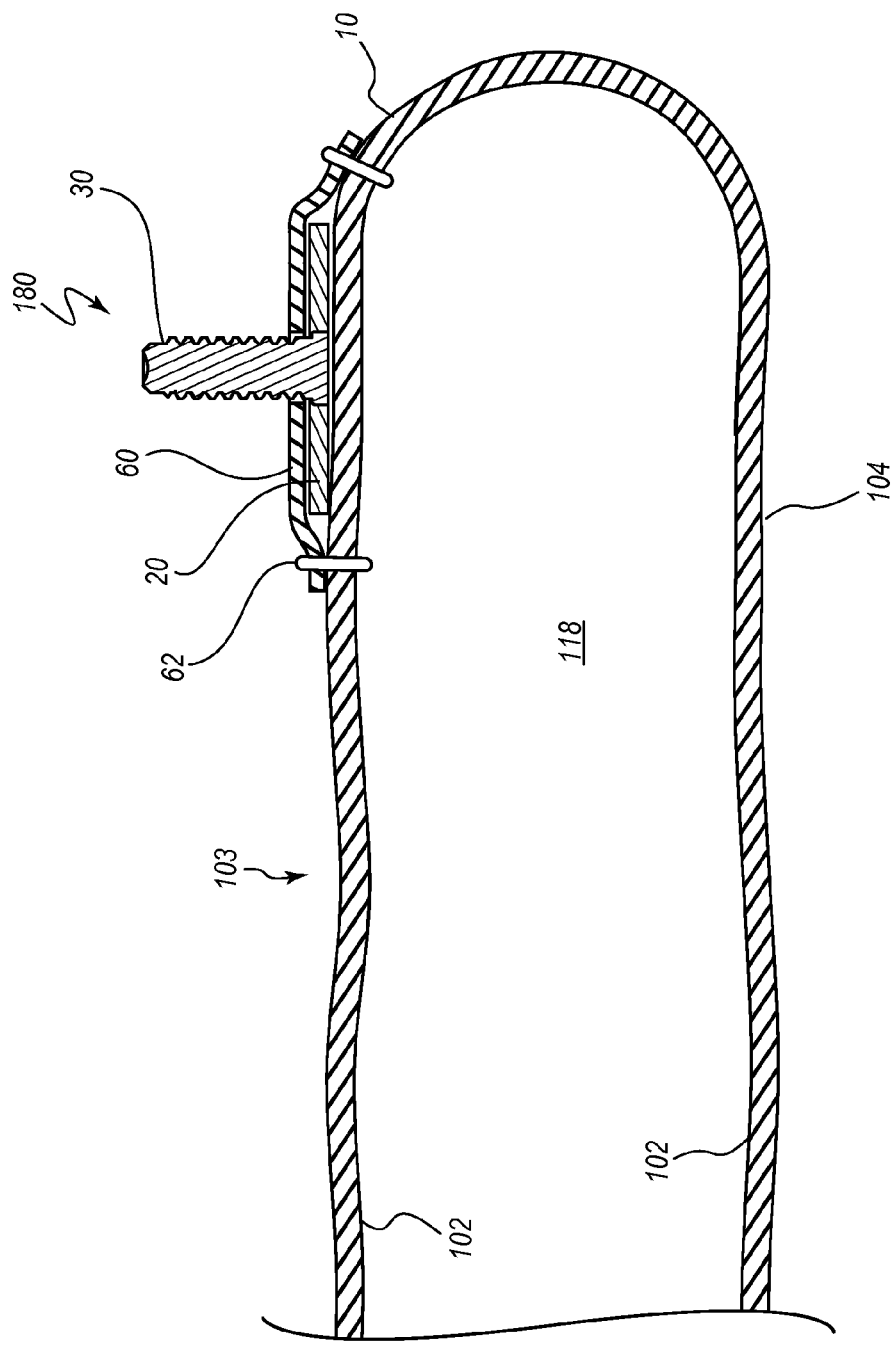
FIG. 7A is a cross-sectional view of a portion of an embodiment of an airbag assembly showing en enlarged view of an embodiment of a mounting assembly that includes a plate with an elongated fastener that are coupled to an exterior of an airbag cushion.

FIG. 7A shows a cross-sectional view of an embodiment of a mounting assembly 180. The airbag cushion 10 is partially inflated, with a bottom layer 104 and upper layer 103 of the membrane, and an interior 118. The plate 20 is coupled to an exterior of the airbag cushion 10 and lies within the pocket formed by cover 60 and the airbag cushion.

Figure 7B:
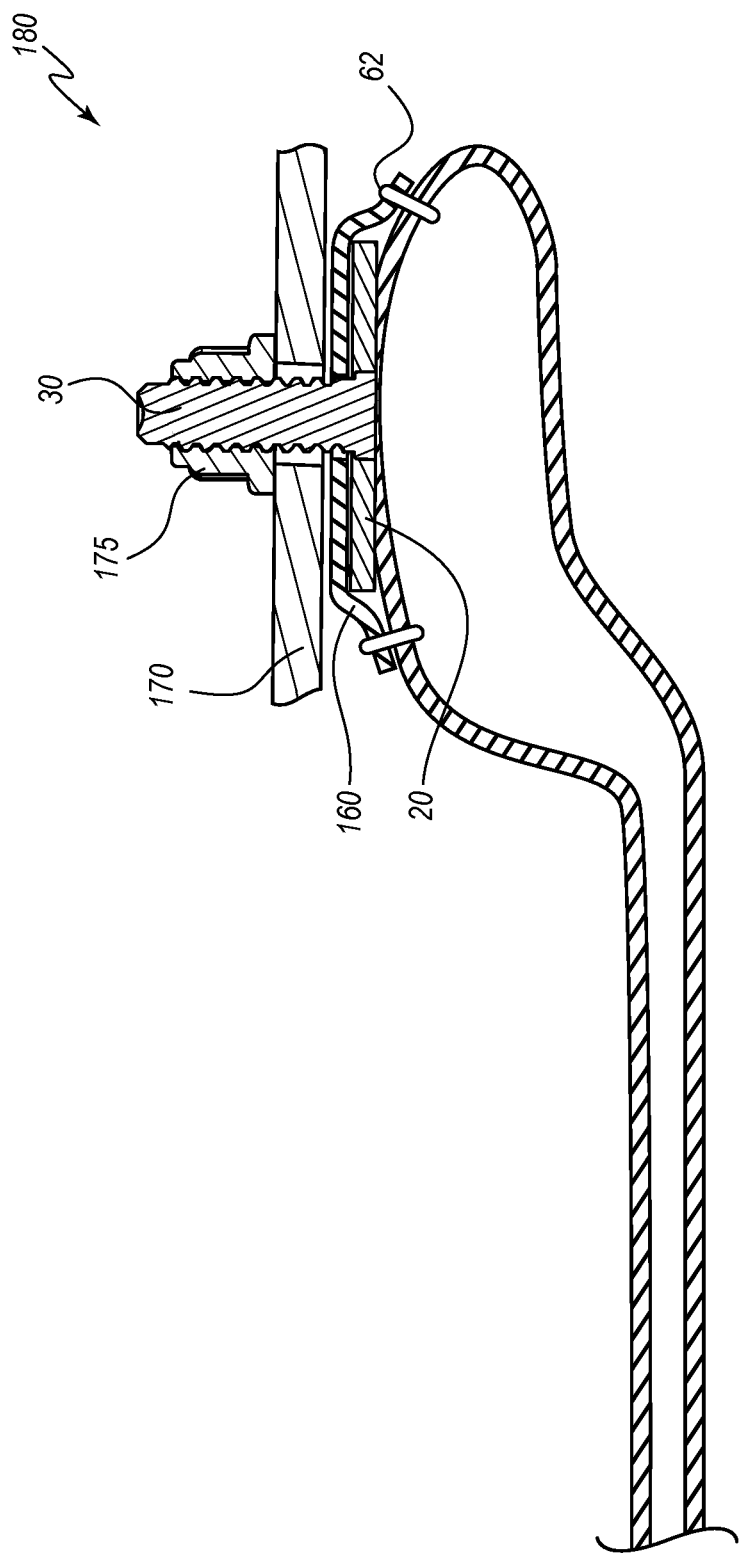
FIG. 7B is another cross-sectional view of a portion of the embodiment of an airbag assembly showing the mounting assembly secured to a vehicular structure.

FIG. 7B shows a cross-sectional view of an embodiment of the mounting assembly 180 of FIG. 7A, attached to a vehicular structure 170.

Figure 8A:
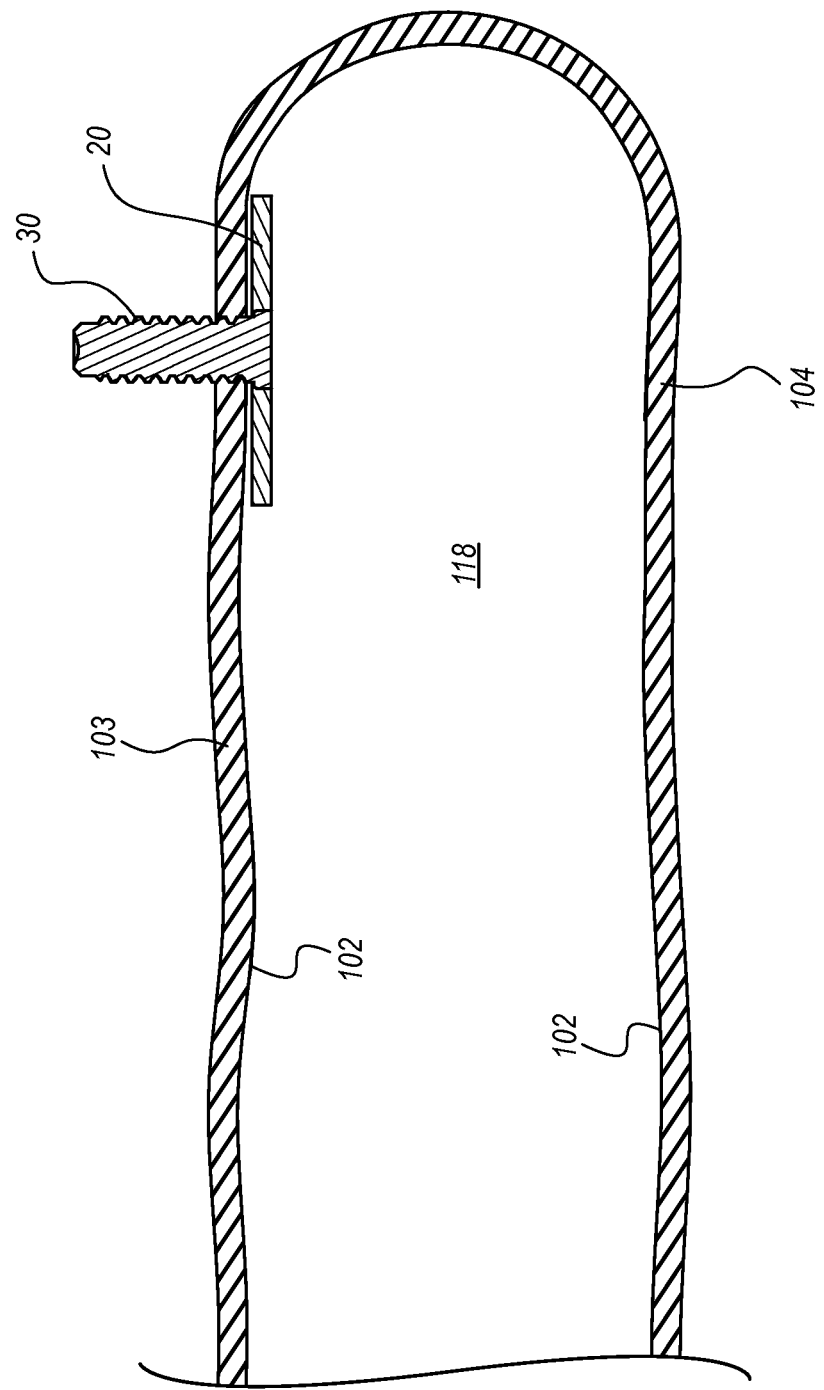
FIG. 8A is a cross-sectional view of a portion of another embodiment of an airbag assembly showing a close-up view of an embodiment of a mounting assembly including a plate with an extended fastener, wherein the plate is positioned at an interior of an airbag cushion.

FIG. 8A shows a cross-sectional view of an embodiment of a mounting assembly 180 in which the plate is coupled to the interior of the airbag cushion 10. The airbag cushion 10 is partially inflated, with a bottom layer 104 and upper layer 103 of the membrane, and an interior 118. The plate 20 is coupled to an interior of the airbag cushion 10. In some embodiments, the force of the inflation gas is sufficient to couple the plate to the cushion.

In certain embodiments where the plate is coupled to the interior of the airbag cushion 10, the opening for the elongated fastener to extend outside the airbag cushion is designed such that it will not undesirably release the inflator gases when the airbag cushion 10 is deployed.

Figure 8B:
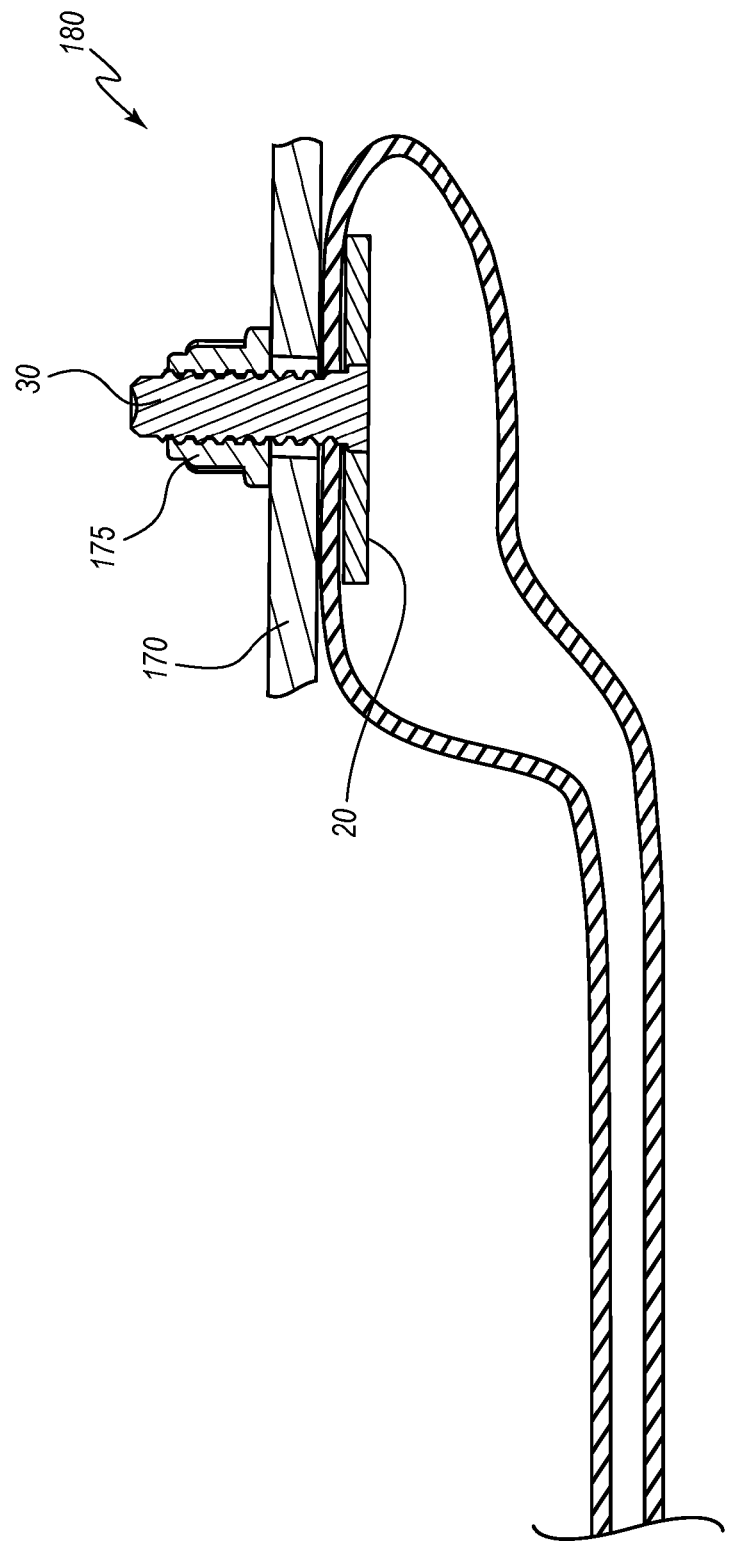
FIG. 8B is another cross-sectional view of the portion of the embodiment of an airbag assembly of FIG. 8A showing the mounting assembly secured to a vehicular structure.

FIG. 8B shows a cross-sectional view of an embodiment of the mounting assembly 180 of FIG. 8A, attached to a vehicular structure 170.

Figure 9B:
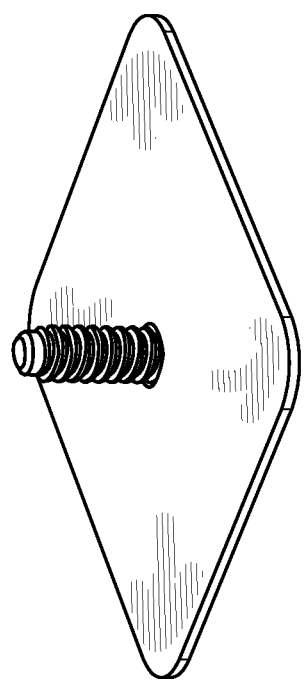
FIG. 9B is a perspective view of a plate and an elongated fastener used in the embodiment of a mounting assembly of FIG. 9A, after attachment of the fastener to the plate.
Figure 9A:
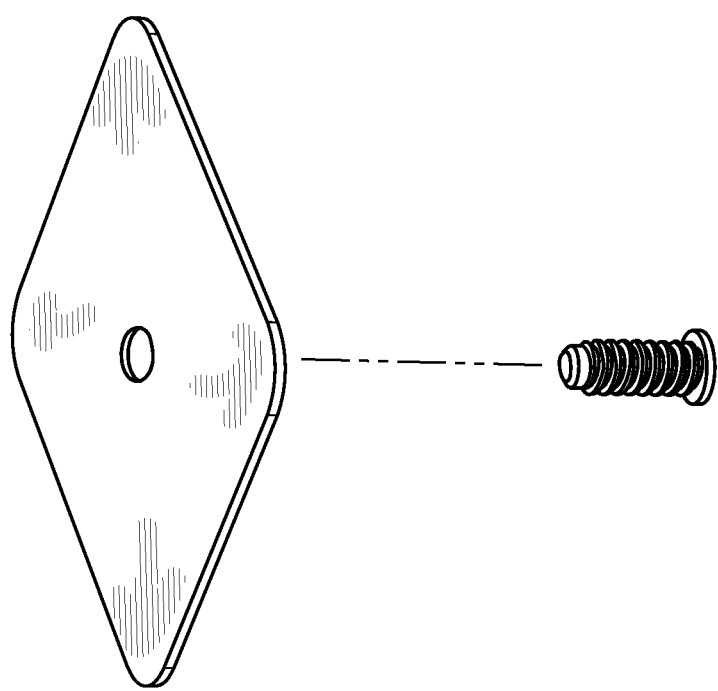
FIG. 9A is a perspective view of a plate and an elongated fastener used in an embodiment of a mounting assembly, prior to attachment of the fastener to the plate.
Figure 10:
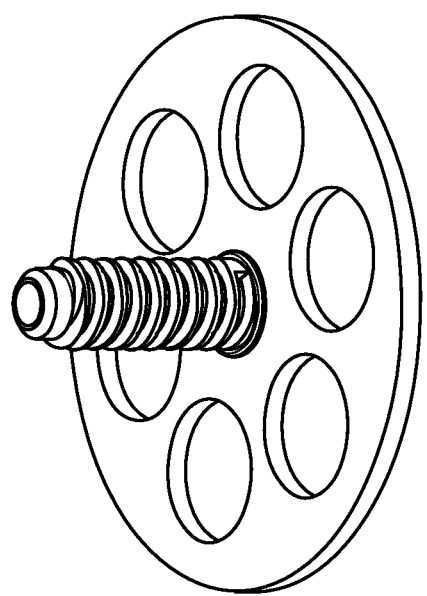
FIG. 10 is a view of another embodiment of a plate and an elongated fastener used in a mounting assembly.

An embodiment of the elongated fastener 30 fixed to the plate 20 is shown in FIG. 9A-9B. The elongated fastener may be, for example, welded or glued to plate 20. An additional embodiment of the plate 20 and the elongated fastener 30 is shown in FIG. 10, which depicts a threaded fastener and a plate which has openings through which the seam 62 may pass to couple the plate to the airbag cushion. The fastener and the plate may be made of the same material and formed together into a unitary assembly.

The periphery of plate 20 may be shaped to cooperate with a periphery of the pocket made by the cover 60 to restrict the plate from rotating about an axis defined by the elongated fastener within the pocket. For example, the plate 20 may comprise one or more corners, such that the pocket restricts rotational movement. The plate 20 may be rectangular or, for example, square, to aid in rotational restriction.

FIG. 11A-11B depict a portion of another embodiment of an airbag assembly 300 that can resemble the inflatable airbag 100 described above in certain respects. Accordingly, like features are designated with like reference numerals, with the leading digits incremented to "3." Relevant disclosure set forth above regarding similarly identified features thus may not be repeated hereafter. Moreover, specific features of the airbag assembly 300 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 300. Any suitable combination of the features and variations of the same described with respect to the airbag assembly 100 can be employed with the airbag assembly 300, and vice versa. This pattern of disclosure applies equally to further embodiments depicted in subsequent figures and described hereafter, wherein the leading digits may be further incremented.

As shown in FIG. 11A-11B, the plate 320 of airbag assembly 300 may be coupled to the airbag cushion 310 directly, without the use of cover 60. In certain embodiments, the plate 320 is directly attached to the airbag cushion 310, for example, by an adhesive, stitches, staples, tape, or welding (e.g., radio frequency welding). In some embodiments, the plate 320 comprises openings through which the stitching passes to couple the plate directly to the airbag cushion.

The airbag cushion 310 may include an attachment region 320 on the exterior surface. In an embodiment, the plate 320 may be coupled to the airbag cushion 310 such that the plate is restricted to the attachment region.

The plate 320 may be coupled to the airbag cushion 310 so as to be non-rotatable about an longitudinal axis defined by the elongated fastener 330, relative to the attachment region of the airbag cushion. The coupling of the plate 320 to the airbag cushion in a non-rotatable manner may aid in the attachment of the airbag assembly 300 to a vehicular structure. For example, a bolt-like elongated fastener and mounting stem may be secured to the vehicular structure via rotation of, for example, a nut. The non-rotatable plate will provide a fixed foundation from which to tighten the securing hardware of the elongated fastener.

In some embodiments, such as when a fastener is used that does not require rotational securing including, for example, a Christmas-tree style bolt, the inability of the plate to rotate will nevertheless reduce the number of degrees of freedom of the mounting assembly. This will yield a more secure attachment of the airbag cushion to the vehicular structure.

Figure 12B:
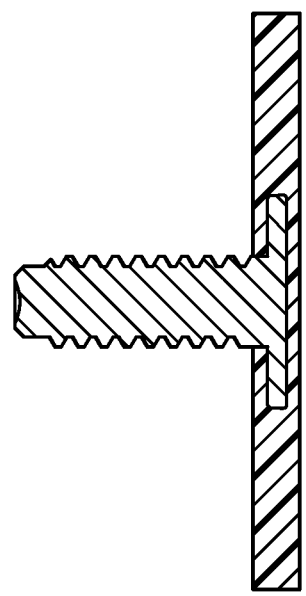
FIG. 12B is a cross-sectional view of the mounting assembly of FIG. 12A taken along the view line 12B-12B in FIG. 12A.
Figure 12A:
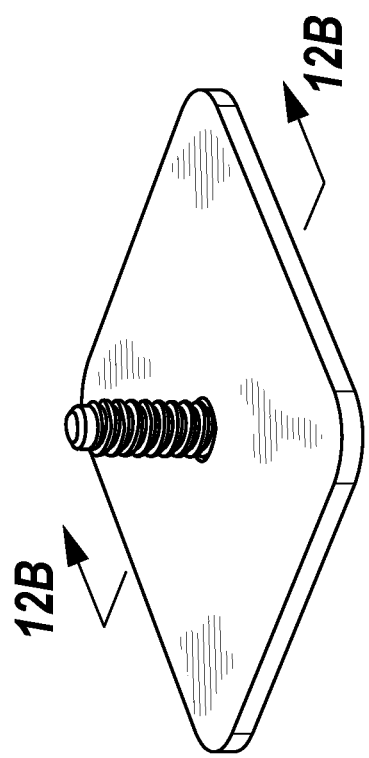
FIG. 12A is an enlarged perspective view of an embodiment of a mounting assembly that includes a plate and elongated fastener that may be used with an airbag assembly such as that illustrated in FIG. 11B.

FIG. 12A-12B show an additional embodiment of the plate 320 fixedly secured to the elongated fastener 330. The plate and the fastener may be made of the same material, or of different material. FIG. 12B shows a cross-sectional view of the mounting assembly of 12A, along the axis 12B-12B.

Figure 13A:
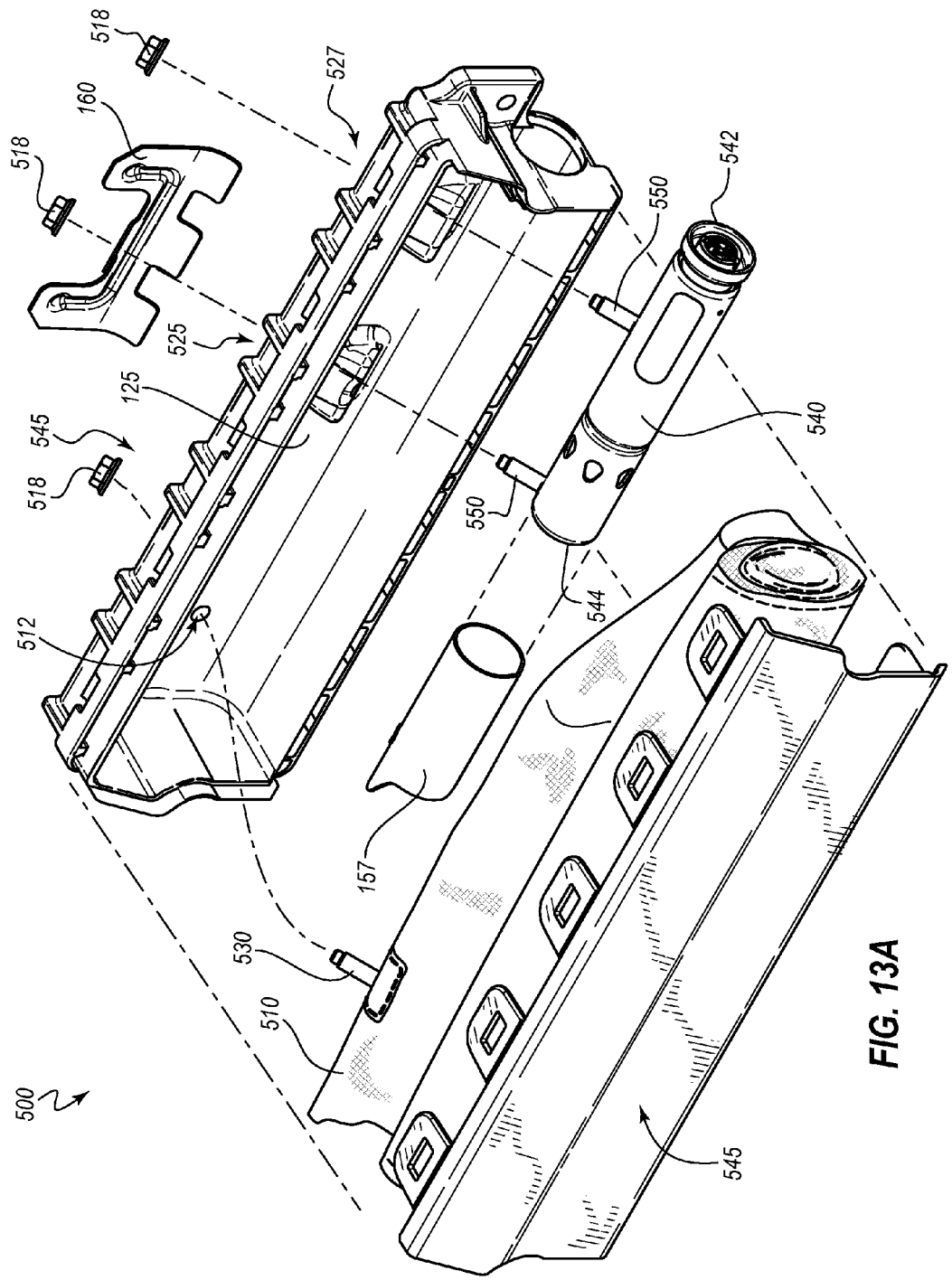
FIG. 13A is an exploded perspective view of a portion of another embodiment of an airbag assembly that includes a housing into which the airbag cushion and the inflator are received.

FIG. 13A shows an airbag assembly 500 which includes a housing 545 (shown divided into two halves) with a first mounting opening 512 and at least one second mounting opening 525, 527, with the elongated fastener 530 extending through the first mounting opening to secure the airbag cushion 510 to the housing. The mounting stem of the inflator 540 extends through the at least one second mounting opening 525, 527 of the housing to secure the inflator and the airbag cushion to the housing, in connection with mounting hardware (i.e. nuts) 518. In the illustrated embodiment, the mounting assembly 580 includes the airbag cushion 510, the elongated fastener 530 affixed to plate 520 (not shown), the inflator 540, inflator mounting stems 550, openings 512, 525, 527 and nuts 518.

The mounting assembly 580 is secured to the housing 545 by passing the elongated fastener 530 through the housing and then securing a nut or other mounting hardware 518 to the elongated fastener at an exterior of the housing. This arrangement can be useful in preventing skewing of the airbag cushion 510 as it is inflated, as the mounting assembly 580, which is longitudinally offset relative to the inflator 540 and its concomitant mounting stems 550 (which secure one side of the airbag to the housing), is able to secure a portion of the airbag to the housing that would otherwise be unrestrained and thus might result in an undesirable deployment profile, in some instances.

Figure 13B:
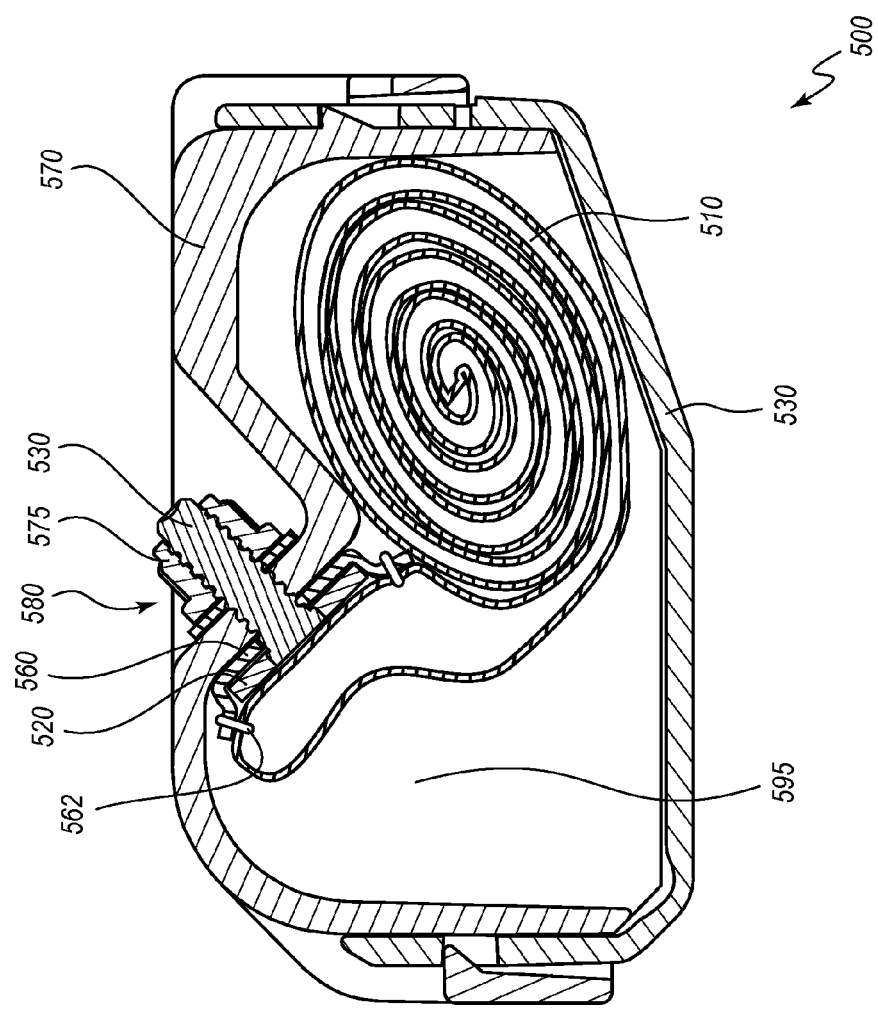
FIG. 13B is a cross-sectional elevation view of the airbag assembly of FIG. 13A, in which the airbag is a knee airbag.

FIG. 13B shows an airbag assembly 500 of a knee airbag embodiment, with housing 545 attached to vehicular structure 570. The interior of the housing 595 contains the airbag and mounting assembly, using mounting hardware 575 to secure the elongated fastener 530 and plate 520, coupled to the airbag cushion 510 with a cover 560 via cover seam 562.

In an embodiment, the airbag assembly includes a curtain airbag, including a curtain airbag cushion and an inflator attached to a vehicular structure such as a roof rail or roof frame, with an elongated fastener and plate coupled to the curtain airbag cushion with a cover and a cover seam.

In various embodiments, airbag assemblies 100 having one or more of the features discussed above can reduce the size and weight of airbag modules and/or can reduce the cost of manufacturing the airbag assemblies. For example, the airbag assembly 100 can be more efficient, in that it can reduce the number of fasteners or mounting stems used and. In some arrangements, such as for certain pelvic restraint cushion systems, an airbag that includes a mounting assembly and that is configured to permit one or more mounting stems of an inflator to pass through it to couple the airbag cushion to a vehicular frame can permit entire components to be omitted. Such omitted components may include, for example, a housing having separate mounting structures. Reducing the amount of fasteners or stems, or other mounting components (e.g., separate housings) that are used in an airbag assembly and mounting within a vehicle can reduce system waste, system weight, energy use, and/or the envelope size of the airbag assembly.

References to approximations are made throughout this specification, such as by use of the terms "about," "approximately," or "substantially." For each such reference, it is to be understood that, in some embodiments, the value, feature, or characteristic may be specified without approximation. Stated otherwise, the terms of approximation include within their scope the exact feature modified by the term of approximation.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f).

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. The scope of the disclosure is therefore defined by the following claims.

The invention claimed is:

1. An airbag assembly comprising:
   an inflator that comprises a mounting stem;
   an inflatable airbag cushion that defines a cavity, wherein the airbag cushion comprises a first opening sized to receive at least a portion of the inflator into the cavity and a second opening through which the mounting stem of the inflator can extend from the cavity to an exterior of the airbag cushion; and a mounting assembly that comprises a plate and an elongated fastener, wherein the elongated fastener is fixedly secured to the plate, and wherein the plate is coupled to the airbag cushion without the elongated fastener extending into the interior cavity of the airbag cushion, wherein the inflator is elongated in a longitudinal direction, and wherein the plate is spaced from an entirety of the inflator in at least the longitudinal direction.

2. The airbag assembly of claim 1, wherein the inflator further comprises an additional mounting stem that is configured to extend through the first opening of the airbag cushion when the other mounting stem of the inflator extends through the second opening of the airbag cushion.

3. The airbag assembly of claim 2, wherein the mounting stems are spaced from each other by a sufficient amount to prevent bunching of the airbag cushion between the first and second openings thereof.

4. The airbag assembly of claim 1, wherein the plate is transverse to the elongated fastener and extends radially outwardly from the elongated fastener.

5. The airbag assembly of claim 1, wherein the plate is rigid and comprises a surface that faces outwardly away from the airbag cushion to frictionally secure the airbag cushion to a separate vehicular structure.

6. The airbag assembly of claim 1, wherein the plate is coupled to the airbag cushion so as to be non-rotatable about a longitudinal axis defined by the elongated fastener.

7. The airbag assembly of claim 1, wherein the plate is coupled to the airbag cushion via stitching.

8. The airbag assembly of claim 7, wherein the plate comprises openings through which the stitching passes to couple the plate to the airbag cushion.

9. The airbag assembly of claim 1, wherein the mounting assembly further comprises a cover attached to the airbag cushion, wherein the cover cooperates with the airbag cushion to define a pocket at an exterior of the airbag cushion, and wherein the plate is at an interior of the pocket.

10. The airbag assembly of claim 9, wherein the cover is attached to the airbag cushion via stitching, and wherein the stitching fully encompasses the plate.

11. The airbag assembly of claim 1, wherein the elongated fastener comprises a threaded bolt.

12. The airbag assembly of claim 1, further comprising a housing that defines a first mounting opening and a second mounting opening, wherein the elongated fastener extends through the first mounting opening to secure the airbag cushion to the housing, and wherein the mounting stem of the inflator extends through the second opening of the airbag and through the second mounting opening of the housing to secure the inflator and the airbag to the housing.

13. The airbag assembly of claim 1, wherein the inflator is elongated in a longitudinal direction and the mounting stem extends in a direction perpendicular to the longitudinal direction.

14. An airbag assembly comprising:
an airbag cushion having an interior surface and an exterior surface, wherein the interior surface of the airbag cushion defines a cavity, and wherein the exterior surface comprises an attachment region; and
a plate at an exterior of the airbag cushion, wherein the plate is coupled to the airbag cushion such that the plate is restricted to the attachment region;
an elongated fastener attached to the plate, wherein the elongated fastener extends from the plate in a direction that is away from the exterior surface of the cushion; and
a cover attached to the airbag cushion to define a pocket at an exterior of the airbag cushion, wherein the plate is at an interior of the pocket.

15. The airbag assembly of claim 14, wherein an area of the attachment region is greater than an area of a surface of the plate that faces the attachment region, and wherein the plate is movable within the pocket.

16. The airbag assembly of claim 14, wherein a periphery of the plate is shaped to cooperate with a periphery of the pocket to restrict the plate from rotating about an axis defined by the elongated fastener within the pocket.

17. The airbag assembly of claim 16, wherein the plate comprises one or more corners.

18. The airbag assembly of claim 14, wherein the plate is coupled to the airbag cushion so as to be non-rotatable, relative to the attachment region of the airbag cushion, about a longitudinal axis defined by the elongated fastener.

19. The airbag assembly of claim 14, further comprising an inflator that comprises a mounting stem, wherein the airbag cushion comprises a first opening sized to receive at least a portion of the inflator into the cavity and a second opening through which the mounting stem of the inflator can extend from the cavity of the airbag cushion to an exterior of the airbag cushion.

20. The airbag assembly of claim 14, further comprising a housing that defines a mounting opening, wherein the elongated fastener extends through the mounting opening to secure the airbag cushion to the housing.

21. The airbag assembly of claim 19, wherein the inflator is elongated in a longitudinal direction, and wherein the plate is spaced from an entirety of the inflator in at least the longitudinal direction.

22. An airbag assembly comprising:
an airbag cushion defining an inflatable cavity at an interior thereof; and
a mounting assembly permanently secured to the airbag cushion, wherein the mounting assembly comprises:
an elongated fastener that comprises a proximal end and a distal end, wherein the distal end of the elongated fastener is at an exterior of the airbag cushion;
a plate attached to the fastener; and
an attachment element that extends through the airbag cushion to limit movement of the plate relative to the airbag cushion.

23. The airbag assembly of claim 22, wherein the mounting assembly further comprises a cover that cooperates with the airbag cushion to define a pocket within which the plate is restrained, and wherein the attachment element comprises stitching that secures the cover to the airbag cushion.

24. The airbag assembly of claim 22, wherein the attachment element comprises stitching that passes through each of the plate and the airbag cushion to directly attach the plate to the airbag cushion.

25. The airbag assembly of claim 22, wherein the proximal end of the elongated fastener is attached to the plate at an exterior of the airbag cushion.

26. The airbag assembly of claim 22, wherein the mounting assembly comprises one or more of a stitch, a staple, or a welding seam.

27. The airbag assembly of claim 22, further comprising an inflator that is elongated in a longitudinal direction, wherein the plate is spaced from an entirety of the inflator in at least the longitudinal direction.

28. An airbag assembly comprising:
an airbag cushion having an interior surface and an exterior surface, wherein the interior surface of the airbag cushion defines a cavity, and wherein the exterior surface comprises an attachment region; and a plate coupled to an exterior of the airbag cushion such that the plate is restricted to the attachment region, wherein the plate is coupled to the airbag cushion at a position spaced from an entirety of an inflator position in a longitudinal direction, wherein the inflator position is defined by a region in which an inflator that is elongate in the longitudinal direction is configured to be disposed when the inflator is coupled to the airbag cushion for securing the airbag assembly to a housing; and an elongated fastener attached to the plate, wherein the elongated fastener extends from the plate in a direction that is away from the exterior surface of the cushion.

* * * * *

UNITED STATES PATENT AND TRADEMARK OFFICE
CERTIFICATE OF CORRECTION

| | | |
|---|---|---|
| PATENT NO. | : 8,998,248 B2 | Page 1 of 1 |
| APPLICATION NO. | : 13/842605 | |
| DATED | : April 7, 2015 | |
| INVENTOR(S) | : Balaskandan Shankar et al. | |

It is certified that error appears in the above-identified patent and that said Letters Patent is hereby corrected as shown below:

On the title page item (72), change "Mark Hadfield" to "Mark Hatfield"

Signed and Sealed this
Fourteenth Day of July, 2015

Michelle K. Lee
*Director of the United States Patent and Trademark Office*